United States Patent
Daikoku et al.

(10) Patent No.: US 10,883,836 B2
(45) Date of Patent: Jan. 5, 2021

(54) TRAVEL-LANE ESTIMATION SYSTEM

(71) Applicant: Mitsubishi Electric Corporation, Chiyoda-ku (JP)

(72) Inventors: Kentaro Daikoku, Tokyo (JP); Yuji Igarashi, Tokyo (JP); Masahiko Ikawa, Tokyo (JP); Masatoshi Fujii, Tokyo (JP); Takashi Irie, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 88 days.

(21) Appl. No.: 16/099,510

(22) PCT Filed: Jul. 5, 2016

(86) PCT No.: PCT/JP2016/069886
§ 371 (c)(1),
(2) Date: Nov. 7, 2018

(87) PCT Pub. No.: WO2018/008082
PCT Pub. Date: Jan. 11, 2018

(65) Prior Publication Data
US 2019/0120632 A1  Apr. 25, 2019

(51) Int. Cl.
*G01C 21/30* (2006.01)
*G08G 1/0969* (2006.01)
(Continued)

(52) U.S. Cl.
CPC ......... *G01C 21/30* (2013.01); *G01C 21/165* (2013.01); *G01C 21/20* (2013.01); *G01S 19/13* (2013.01); *G08G 1/0969* (2013.01)

(58) Field of Classification Search
CPC ...... G01C 21/30; G01C 21/165; G01C 21/20; G08G 1/0969; G01S 19/13
See application file for complete search history.

(56) References Cited

U.S. PATENT DOCUMENTS

2017/0336515 A1* 11/2017 Hosoya ............... G01S 19/49
2018/0165525 A1*  6/2018 Hamada .............. G01C 21/30
(Continued)

FOREIGN PATENT DOCUMENTS

JP        11-211491 A    8/1999
JP        3559142 B2     8/2004

OTHER PUBLICATIONS

International Search Report dated Sep. 27, 2016 in PCT/JP2016/069886 filed on Jul. 5, 2016.

*Primary Examiner* — Thomas Ingram
(74) *Attorney, Agent, or Firm* — Xsensus LLP

(57) ABSTRACT

A travel-lane estimation system includes: a GNSS receiver; a vehicle-speed calculator; an angular-velocity measurement mechanism; a subject-vehicle-position positioner calculating a vehicle's reference coordinate and reference orientation from a GNSS coordinate, and calculating time series data of vehicle's positions; a map information storage storing positional information about a division line of each lane; and a lane estimator calculating, as an optimal correction amount, an error pattern having a highest posterior probability among plural error patterns, correcting the time series data using the optimal correction amount, and comparing the corrected time series data with the division line, to estimate a vehicle's travel lane, the posterior probability calculated with the product of prior occurrence probability of the time series data by the plural error patterns and a likelihood calculated, under condition that the error pattern has occurred, based on a relative positional relationship between the corrected time series data and the division line.

6 Claims, 16 Drawing Sheets

(51) Int. Cl.
*G01C 21/16* (2006.01)
*G01C 21/20* (2006.01)
*G01S 19/13* (2010.01)

(56) References Cited

U.S. PATENT DOCUMENTS

2018/0201271 A1\* 7/2018 Ishioka ................ B60W 10/08
2018/0273031 A1\* 9/2018 Fujita .................... G01C 21/30

\* cited by examiner

F I G. 1
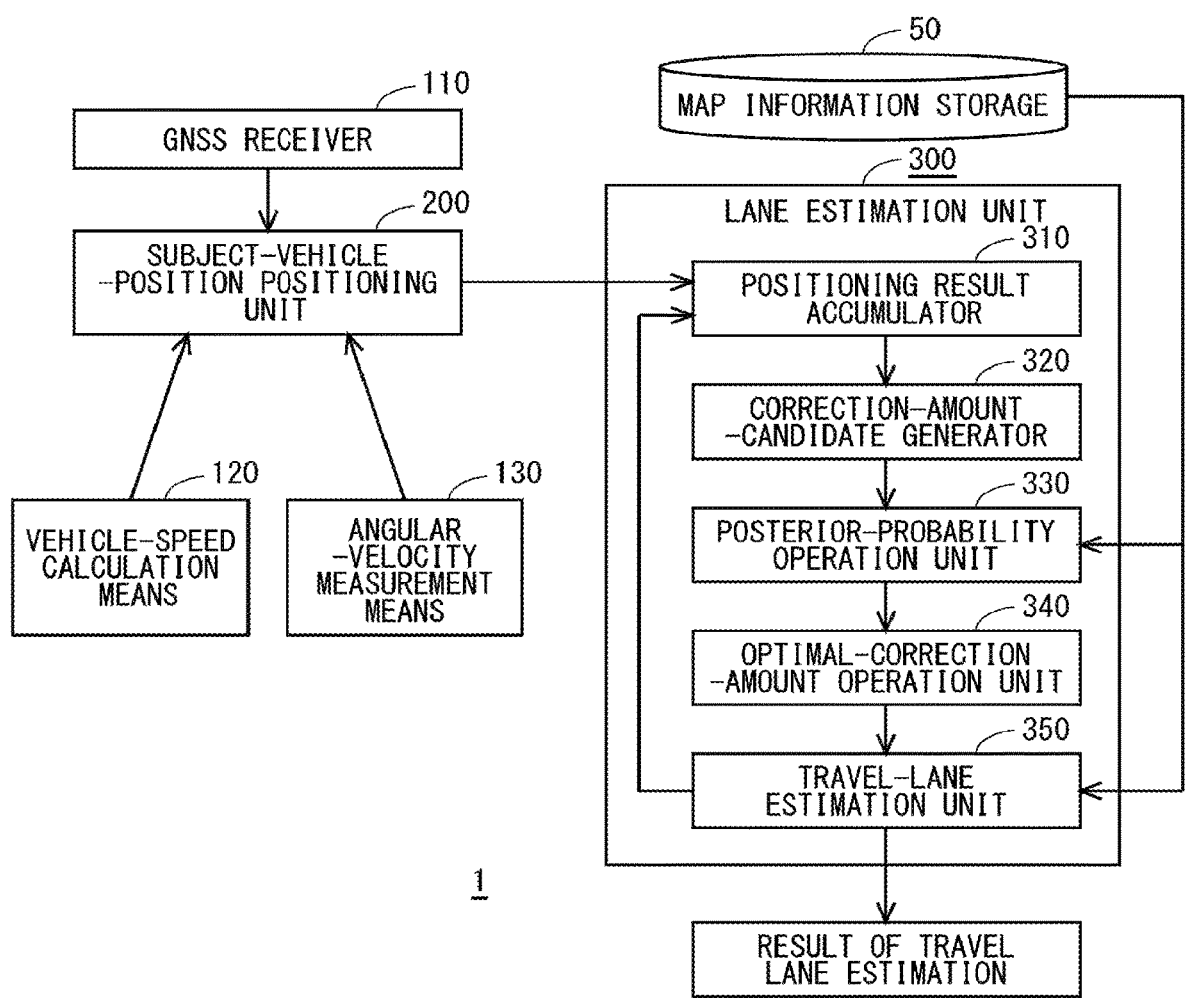

FIG. 4

REFERENCE COORDINATE, REFERENCE ORIENTATION

| | REFERENCE X-COORDINATE [LONGITUDE] | REFERENCE Y-COORDINATE [LATITUDE] | REFERENCE ORIENTATION [DEGREE] |
|---|---|---|---|
| | 135.12345678 | 35.87684321 | 30.0 |

POSITIONING-RESULT ACCUMULATED DATA

| TIME | X-COORDINATE [LONGITUDE] | Y-COORDINATE [LATITUDE] | ORIENTATION [DEGREE] |
|---|---|---|---|
| 10:00:00.000 | 135.12345678 | 35.87684321 | 30.0 |
| 10:00:00.020 | 135.12346789 | 35.87684319 | 30.7 |
| 10:00:00.040 | 135.12347900 | 35.87684317 | 31.2 |
| ⋮ | ⋮ | ⋮ | ⋮ |
| 10:00:09.980 | 135.12456789 | 35.87684200 | 38.5 |

F I G. 6

| PATTERN No | X-DIRECTION ERROR [cm] x | Y-DIRECTION ERROR [cm] y | ORIENTATION ERROR [DEGREE] $\theta$ |
|---|---|---|---|
| 1 | 0 | 0 | 0 |
| 2 | 10 | 0 | 0 |
| 3 | 0 | 10 | 1 |
| 4 | 10 | 10 | 0 |
| 5 | 10 | 0 | 1 |
| 6 | 10 | 0 | −1 |
| 7 | 0 | 10 | −1 |
| ⋮ | ⋮ | ⋮ | ⋮ |

F I G. 9

REFERENCE COORDINATE, REFERENCE ORIENTATION

| | BEFORE CORRECTION | | | AFTER CORRECTION | | |
|---|---|---|---|---|---|---|
| | REFERENCE X-COORDINATE [LONGITUDE] | REFERENCE Y-COORDINATE [LATITUDE] | REFERENCE ORIENTATION [DEGREE] | REFERENCE X-COORDINATE [LONGITUDE] | REFERENCE Y-COORDINATE [LATITUDE] | REFERENCE ORIENTATION [DEGREE] |
| | 135.12345678 | 35.87684338 | 30.0 | 135.12345689 | 35.87684355 | 31.0 |

POSITIONING-RESULT ACCUMULATED DATA

| TIME | BEFORE CORRECTION | | | AFTER CORRECTION | | |
|---|---|---|---|---|---|---|
| | X-COORDINATE [LONGITUDE] | Y-COORDINATE [LATITUDE] | ORIENTATION [DEGREE] | X-COORDINATE [LONGITUDE] | Y-COORDINATE [LATITUDE] | ORIENTATION [DEGREE] |
| 10:00:00.000 | 135.12345678 | 35.87684338 | 30.0 | 135.12345689 | 35.87684355 | 31.0 |
| 10:00:00.020 | 135.12346789 | 35.12345723 | 30.2 | 135.12346804 | 35.12345745 | 31.2 |
| 10:00:00.040 | 135.12347900 | 35.12345789 | 30.5 | 135.12347919 | 35.12345816 | 31.5 |
| ⋮ | ⋮ | ⋮ | ⋮ | ⋮ | ⋮ | ⋮ |
| 10:00:09.980 | 135.12456789 | 35.12352345 | 50.1 | 135.12456935 | 35.12352379 | 51.1 |

F I G. 1 0

| PATTERN No | X-DIRECTION ERROR [cm] x | Y-DIRECTION ERROR [cm] y | ORIENTATION ERROR [DEGREE] $\theta$ | PRIOR OCCURRENCE PROBABILITY OF ERROR $P1(x, y, \theta)$ | PATH LIKELIHOOD $P2(x, y, \theta)$ | POSTERIOR PROBABILITY OF CORRECTION AMOUNT $P(x, y, \theta)$ |
|---|---|---|---|---|---|---|
| 1 | 0 | 0 | 0 | 0.0010 | 0.75 | 0.000750 |
| 2 | 10 | 0 | 0 | 0.0005 | 0.80 | 0.000400 |
| 3 | 0 | 10 | 1 | 0.0012 | 0.34 | 0.000408 |
| 4 | 10 | 10 | 0 | 0.0030 | 0.60 | 0.001800 |
| 5 | 10 | 0 | 1 | 0.0001 | 0.27 | 0.000027 |
| ⋮ | ⋮ | ⋮ | ⋮ | ⋮ | ⋮ | ⋮ |

OPTIMAL CORRECTION AMOUNT $(\hat{x}, \hat{y}, \hat{\theta})$

HIGHEST POSTERIOR PROBABILITY

FIG. 13

| PATTERN No | ORIENTATION ERROR [DEGREE] θ |
|---|---|
| 1 | 0.0 |
| 2 | 0.5 |
| 3 | -0.5 |
| 4 | 1.0 |
| 5 | -1.0 |
| 6 | 1.5 |
| 7 | -1.5 |
| ⋮ | ⋮ |

FIG. 14

REFERENCE COORDINATE, REFERENCE ORIENTATION

| | BEFORE CORRECTION | | | AFTER CORRECTION | | |
|---|---|---|---|---|---|---|
| | REFERENCE X-COORDINATE [LONGITUDE] | REFERENCE Y-COORDINATE [LATITUDE] | REFERENCE ORIENTATION [DEGREE] | REFERENCE X-COORDINATE [LONGITUDE] | REFERENCE Y-COORDINATE [LATITUDE] | REFERENCE ORIENTATION [DEGREE] |
| | 135.12345687 | 35.87684341 | 30.0 | 135.12345678 | 35.87684338 | 31.0 |

POSITIONING-RESULT ACCUMULATED DATA

| TIME | BEFORE CORRECTION | | | AFTER CORRECTION | | |
|---|---|---|---|---|---|---|
| | X-COORDINATE [LONGITUDE] | Y-COORDINATE [LATITUDE] | ORIENTATION [DEGREE] | X-COORDINATE [LONGITUDE] | Y-COORDINATE [LATITUDE] | ORIENTATION [DEGREE] |
| 10:00:00.000 | 135.12345687 | 35.87684341 | 30.0 | 135.12345678 | 35.87684338 | 31.0 |
| 10:00:00.020 | 135.12346789 | 35.12345723 | 30.2 | 135.12346789 | 35.12345723 | 31.2 |
| 10:00:00.040 | 135.12347900 | 35.12345789 | 30.5 | 135.12347900 | 35.12345789 | 31.5 |
| ⋮ | ⋮ | ⋮ | ⋮ | ⋮ | ⋮ | ⋮ |
| 10:00:09.980 | 135.12456789 | 35.12352345 | 50.1 | 135.12456789 | 35.12352345 | 51.1 |

F I G. 1 5

| PATTERN No | X-DIRECTION ERROR [cm] x | Y-DIRECTION ERROR [cm] y | ORIENTATION ERROR [DEGREE] θ | PRIOR OCCURRENCE PROBABILITY OF ERROR P1(θ) | PATH LIKELIHOOD P2(θ) | POSTERIOR PROBABILITY OF CORRECTION AMOUNT P(θ) |
|---|---|---|---|---|---|---|
| 1 | 0 | 0 | 0.0 | 0.0003 | 0.73 | 0.000219 |
| 2 | 0 | 0 | 0.5 | 0.0005 | 0.57 | 0.000285 |
| 3 | 0 | 0 | −0.5 | 0.0012 | 0.48 | 0.000576 |
| 4 | 0 | 0 | 1.0 | 0.0007 | 0.62 | 0.000434 |
| 5 | 0 | 0 | −1.0 | 0.0004 | 0.31 | 0.000124 |
| ⋮ | ⋮ | ⋮ | ⋮ | ⋮ | ⋮ | ⋮ |

OPTIMAL CORRECTION AMOUNT ($\theta\char`\^$)

HIGHEST POSTERIOR PROBABILITY

F I G. 1 6
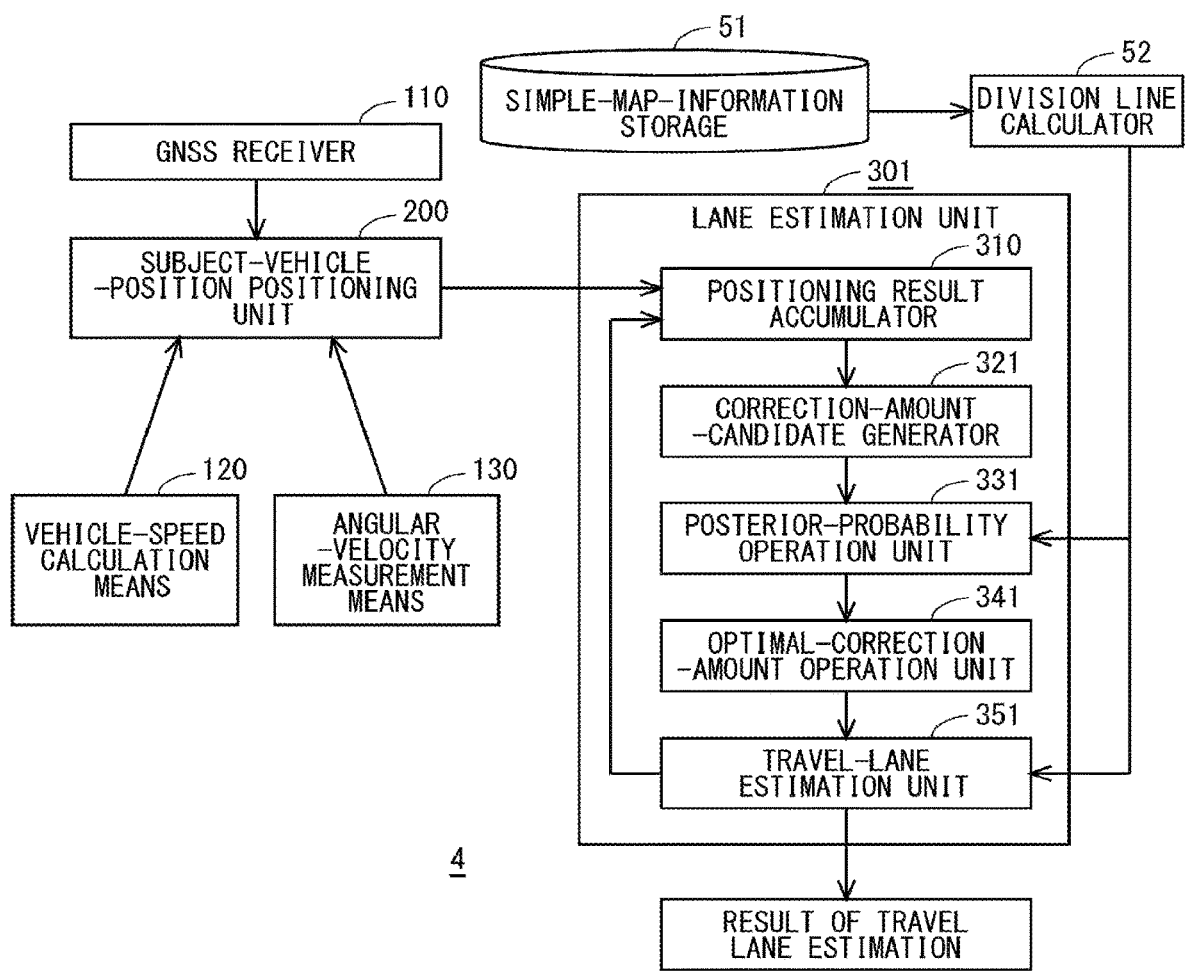

F I G. 1 8
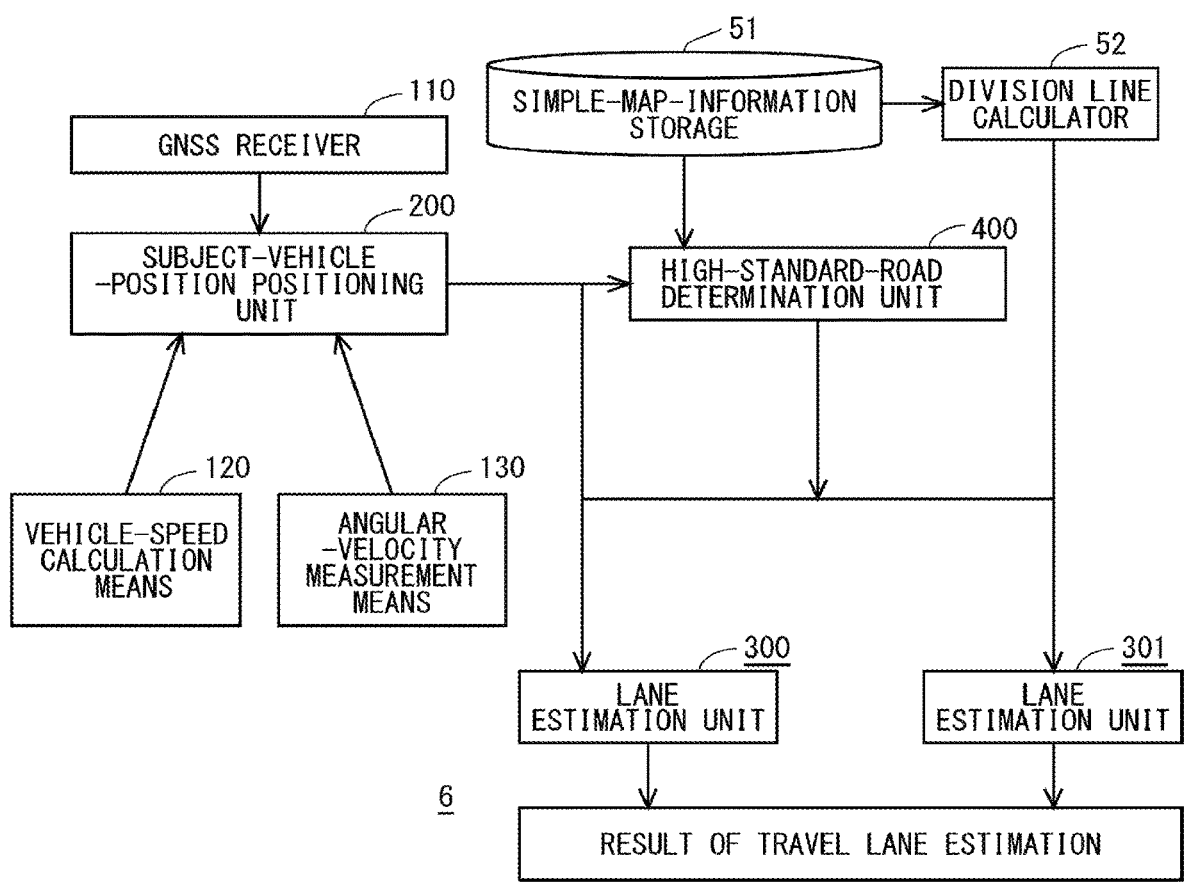

TRAVEL-LANE ESTIMATION SYSTEM

TECHNICAL FIELD

The present invention relates to a technique of estimating a lane on which a subject vehicle, a driver's vehicle driven by the driver, is travelling.

BACKGROUND ART

A navigation system commonly holds subject-vehicle-position estimation coordinates that is obtained by undergoing dead reckoning with some information, such as vehicle-speed signal information calculated from vehicle's wheel rotations and angular velocity information obtained from a gyro sensor, being incorporated into Global-Navigation-Satellite-System (GNSS) coordinate information received from a satellite.

When using a common navigation map depicting a road using only links and nodes as well as attribute information correlated with them, the navigation system calculates, through map matching, in which position and on which road link the subject vehicle (driver's vehicle driven by the driver) is travelling, to thus determine where to display a vehicle's position (car mark) on the map.

The common navigation map unfortunately contains no information about the detailed shapes of lanes, and depicts a whole road including a plurality of lanes using for instance, line segments or curves. For this reason, the navigation system, through map matching, does estimate which road the vehicle is travelling on, but cannot estimate which lane the vehicle is travelling on. Moreover, the accuracy of estimating a subject-vehicle's position obtained through dead reckoning is commonly susceptible to satellite reception environments, such as multipath propagation, and involves an error of about 10 m in some reception environments. For this reason, the navigation system currently has a low probability of correctly estimating an actual travel lane even though obtaining the detailed shape of each lane to calculate a lane that is the closest to a position obtained by dead reckoning.

Meanwhile, a dominant method for identifying a travel lane is a technique using the results of camera image analysis. Such a technique includes obtaining white-line information around the subject vehicle through analysis of image information obtained from a camera, and sensing the fact that the subject vehicle has crossed a lane using time series data of the distance between the subject vehicle and the white-line information, thereby detecting a lane change.

Unfortunately, a camera promising for travel lane identification requires an exclusive specification; thus, installing a camera for the sake of travel lane identification alone imposes a significant economic burden on a user. Accordingly, a product employing such travel lane estimation using a camera image has not widely spread on the market.

To address this problem, Patent Document 1 describes a technique for correcting a subject-vehicle's position without a camera. This technique includes, first in a travel-lane identification means, correcting the coordinate and orientation of the subject vehicle on the basis of shape information contained in a map and identifying a travel road, through pattern matching. The technique includes, subsequently in a lane calculation means, calculating the probability that the subject vehicle is travelling on each travel lane on the basis of shape data of each virtual lane created using information about the number of lanes and road widths contained in a navigation map, and on the basis of positioning coordinates at individual times.

PRIOR ART DOCUMENTS

Patent Documents

Patent Document 1: Japanese Patent Application Laid-Open No. 11-211491

SUMMARY

Problem to be Solved by the Invention

The technique in Patent Document 1 proposes an idea of creating a template of a vehicle's trace using map data, and correcting positioning results in chronological order so that an actual vehicle's trace falls within the template. Unfortunately, this template is used for matching using a travelable region on the entire road as a template, and thus is not used for matching using a travelable region on each, lane as a template. Hence, lane-level orientation correction cannot be made in a road composed of a plurality of lanes, thus failing to achieve orientation correction with expected accuracy through pattern matching in some cases.

To solve this problem, it is an object of the present invention to use positional information about a division line of each lane, to calculate the posterior probability of the correction amount of orientation (also coordinate as necessary) using an evaluation value indicating the likelihood of a path calculated on the basis of a positional relationship of a vehicle's position relative to the division line contained in a map, to determine an optimal correction value of orientation (also coordinate as necessary) of a subject vehicle, the optimal correction value having the highest posterior probability, and to detect a lane change and estimate a current travel lane, from a vehicle's trace obtained by correction.

Means to Solve the Problem

A travel-lane estimation system according to the present invention includes the following: a GNSS receiver configured to receive a coordinate of a vehicle through a Global-Navigation-Satellite-System (GNSS); a vehicle-speed calculation means for calculating a vehicle speed from a travel distance of the vehicle; an angular-velocity measurement means for measuring an angular velocity from an amount of change in vehicle's orientation; a subject-vehicle-position positioning unit configured to calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity; a map information storage configured to store map information including positional information about a division line of a lane; and a lane estimation unit configured to calculate, as an optimal correction amount, an error pattern having a posterior probability that is the highest among a plurality of error patterns, correct the time series data using the optimal correction amount, and compare the time series data as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line.

A travel-lane estimation system according to the present invention includes the following: a GNSS receiver configured to receive a coordinate of a vehicle through a Global-Navigation-Satellite-System (GNSS); a vehicle-speed calculation means for calculating a vehicle speed from a travel distance of the vehicle; an angular-velocity measurement means for measuring an angular velocity from an amount of change in vehicle's orientation; a subject-vehicle-position positioning unit configured to calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity; a simple-map-information storage configured to store map information including information about node coordinates forming a road link, a road width, the number of lanes, and a travelable direction; a division line calculator configured to calculate a division line of a lane from the map information; and a lane estimation unit configured to calculate, as an optimal correction amount, an error pattern having a posterior probability that is the highest among a plurality of error patterns, correct the time series data using the optimal correction amount, and compare the time series as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line.

Effects of the Invention

The travel-lane estimation system of the present invention determines the posterior probability using the positional information about the division line of each lane and corrects the posterior probability using the optimal correction amount. This enables, from a vehicle's trace, accurate lane-change detection and accurate estimation of a current travel lane.

BRIEF DESCRIPTION OF DRAWINGS

FIG. 1 is a diagram illustrating the configuration of a travel-lane estimation system according to a first embodiment.

FIG. 4 shows a specific example of intermediate output results in the travel-lane estimation system according to the first embodiment.

FIG. 6 shows a specific example of error patterns in the travel-lane estimation system according to the first embodiment.

FIG. 9 shows a specific example of positioning-result accumulated data before and after correction in the travel-lane estimation system according to the first embodiment.

FIG. 10 shows a specific example of an optimal correction amount in the travel-lane estimation system according to the first embodiment.

FIG. 13 shows a specific example of error patterns in the travel-lane estimation system the according to the third embodiment.

FIG. 14 shows a specific example of positioning-result accumulated data before and after correction in the travel-lane estimation system according to the third embodiment.

FIG. 15 shows a specific example of an optimal correction amount in the travel-lane estimation system according to the third embodiment.

FIG. 16 is a diagram illustrating the configuration of a travel-lane estimation system according to a fourth embodiment.

FIG. 18 is a diagram illustrating the configuration of a travel-lane estimation system according to a sixth embodiment.

DESCRIPTION OF EMBODIMENT(S)

First Embodiment

Figure 2:
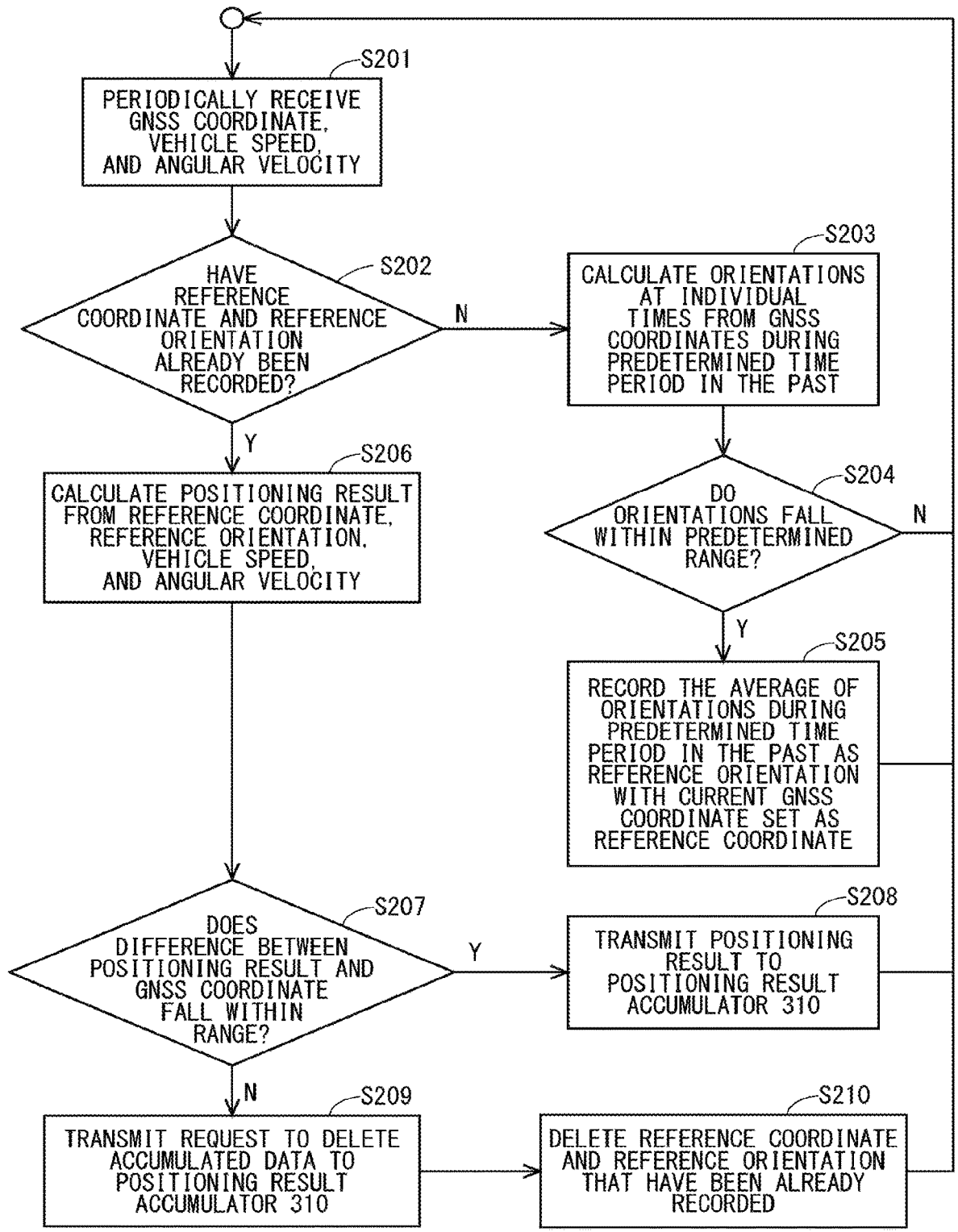
FIG. 2 is a flowchart showing how to work the positioning of subject-vehicle's position in a subject-vehicle-position positioning unit of the travel-lane estimation system according to the first embodiment.

FIG. 1 is diagram illustrating the configuration of a travel-lane estimation system 1 according to a first embodiment. This system controls a movable object, such as a vehicle, and estimates a lane on which the movable object, a target to be controlled, is travelling. A travel-lane estimation system 1 includes a map information storage 50, a GNSS receiver 110, a vehicle-speed calculation means 120, an angular-velocity measurement means 130, a subject-vehicle-position positioning unit 200, and a lane estimation unit 300.

The map information storage 50 stores map information including at least detailed positional information of each lane. The detailed positional information of each lane herein is positional information about a division line of each lane. An example of the positional information about the division line of each lane is information about a coordinate string on the division line. The positional information about the division line of each lane can be expressed as line segments each linking two adjacent coordinates to each other in the coordinate string on the division line. Further, the center line and width of each lane can be calculated from the positional information about the division line of each lane.

Alternatively, the positional information about the division line of each lane may be information about the coordinate string of the center line of each lane and the width of each lane. This is because that the center line of each lane can be calculated as line segments each linking two adjacent coordinates to each other on the coordinate string of the center line of each lane, and that positions distant by half the lane width constitute positional information about the left and right division lines of each lane. The positional information about the division line or center line of the lane is also expressed using a curve string, such as a string of a plurality of arcs, other than using such line segments. This is because for expression using the string of arcs, each arc can be uniquely expressed by, for instance, a set of the start point, end point, and radius of the arc.

The map information storage 50 includes a storing medium storing highly accurate map data containing the detailed shape of each lane, and is composed of a hard disk drive (HDD), a Memory Stick (registered trademark), and other things. The map information storage 50 can also contain, as a matter of course, common navigation map information composed of, for instance, information about node coordinates, which forms road links, road widths, the number of lanes, and travelable directions.

The GNSS receiver 110 receives a vehicle's coordinate through a GNSS. The GNSS receiver 110 is connected to a GNSS antenna receiving electromagnetic waves from a satellite, and measures a position using the electromagnetic waves from the satellite to output data of a vehicle's position.

The vehicle-speed calculation means 120 calculates a vehicle speed from a vehicle's travel distance. For instance, the vehicle-speed calculation means 120 measures the vehicle's travel distance using a pulse signal output from a distance sensor in accordance with the vehicle's travel distance, to thus calculate the vehicle speed.

The angular-velocity measurement means 130 measures an angular velocity from the amount of change in vehicle's orientation. For instance, the angular-velocity measurement means 130 measures vehicle's angular-velocity data sensed by a gyro.

The subject-vehicle-position measurement means 200 calculates a vehicle's reference coordinate and a vehicle's reference orientation from the vehicle's coordinate received by the GNSS receiver 110, and calculates time series data of vehicle's positioning coordinates and vehicle's positioning orientations from the vehicle's reference coordinate, the vehicle's reference orientation, the vehicle speed, which is calculated by the vehicle-speed calculation means 120, and the angular velocity, which is measured by the angular-velocity measurement means 130. The subject-vehicle-position positioning unit 200 obtains information about the current position of the movable object, such as a vehicle, which is a target to be controlled by the travel-lane estimation system 1.

The lane estimation unit 300 is composed of a positioning result accumulator 310, a correction-amount-candidate generator 320, a posterior-probability operation unit 330, an optimal-correction-amount operation unit 340, and a travel-lane estimation unit 350.

The positioning result accumulator 310 stores, as the time series data, the positioning coordinates and the positioning orientations, which are positioning results obtained from the subject-vehicle-position positioning unit 200 at individual times, in order of occurrence, and deletes the data sequentially from the oldest one when a buffer reaches its upper limit.

The correction-amount-candidate generator 320 first calculates an error distribution of the positioning coordinates and the positioning orientations on the basis of, for instance, the accuracy of GNSS reference-coordinate reception. The correction-amount-candidate generator 320 then determines a range of error (coordinate, orientation) such that the probabilities that the positioning coordinates and the positioning orientations fall within a predetermined range exceed a previously specified threshold, and the correction-amount-candidate generator 320 generates error patterns (coordinate, orientation) falling within the determined range. For instance, let the error distribution be regarded as a three-dimensional normal distribution having an X-direction-error standard deviation $\sigma_X$, Y-direction-error standard deviation $\sigma_Y$, and a $\Theta$-orientation-error standard deviation $\sigma_\Theta$. Then, correction amount candidates (error patterns) are set as all lattice points included in a rectangular parallelepiped based on these standard deviations, the rectangular parallelepipeds satisfying $-2\sigma_X<X<2\sigma_X$, $-2\sigma_Y<Y<2\sigma_Y$, and $-2\sigma_\Theta<\Theta<2\sigma_\Theta$. The coordinates obtained from the GNSS receiver 110 indicate longitudes and latitudes. Herein, the longitudes are transformed into X-coordinates, and the latitudes are transformed into Y-coordinates.

It is noted that a coordinate range of the time series data is 2 to 3 km at most when this algorism is applied; hence, the ground surface can be locally regarded as a plane, and the longitudes and the latitudes can be respectively brought into correspondence with the X-coordinates and the Y-coordinates through linear transformation. Accordingly, operations can be performed using the longitudes and latitudes as they stand without transforming into the X-coordinates and the Y-coordinates, as a matter of course. In this case, calculations need to be done in view of distances per longitude and per latitude at a site concerned. For an operation using the longitude and latitude as they stand, the error pattern can be the combination of longitude, latitude, and orientation.

The posterior-probability operation unit 330 calculates a posterior probability indicating a quantitative feasibility on every correction amount candidate generated in the correction-amount-candidate generator 320. To be more specific, the posterior-probability operation unit 330 first calculates the prior occurrence probability of the time series data by every error pattern generated in the correction-amount-candidate generator 320. The posterior-probability operation unit 330 then calculates a posterior probability calculated with the product of the calculated prior occurrence probability and a likelihood (evaluation value indicating the likelihood of the time series data) calculated, under the condition that the error pattern has occurred, on the basis of a relative positional relationship between the time series data after correction and the division line.

The optimal-correction-amount operation unit 340 calculates, as an optimal correction amount, an error pattern having the highest posterior probability on the basis of the operation results of the posterior probabilities of the error patterns, which are individual correction amount candidates calculated in the posterior-probability operation unit 330.

The travel-lane estimation unit 350 employs the optimal correction amount (most likely correction amount) calculated in the optimal-correction-amount operation unit 340, corrects the time series data using the optimal correction amount, and compares the corrected time series data with the division line, to thus estimate a travel lane of the vehicle.

The following describes how to estimate the travel lane in the travel-lane estimation system 1. FIG. 2 is a flowchart showing how to work the positioning of a subject-vehicle's position in the subject-vehicle-position positioning unit 200. The subject-vehicle-position positioning unit 200 first periodically receives coordinates (GNSS coordinates) from the GNSS receiver 110, vehicle speeds from the vehicle-speed calculation means 120, and angular velocities from the angular-velocity measurement means 130 (step S201). The next step (step S202) is checking whether the reference coordinate, which is a subject-vehicle coordinate, and the reference orientation have already recorded. The reference coordinate and the reference orientation have not yet been recorded at the first time including GNSS coordinate reception and other processing; accordingly, the flow moves to direction N.

The subsequent step (step S203) is calculating orientations at individual times using the coordinates received from the GNSS receiver 110 during a predetermined time period in the past. The next step (step S204) is checking, against the results of orientation calculation, whether all the calculated orientations fall within a predetermined variation range. If yes (direction Y), a current GNSS coordinate is recorded as the reference coordinate; moreover, the average of the orientations during the predetermined time period in the past is recorded as the reference orientation (step S205). Otherwise (direction N), the flow goes back to the initial step without any processing.

The step S204 corresponds to the determination of the straight-travel stability of the vehicle. This step is required in order to start calculation using the reference coordinate and the reference orientation, calculated based on the GNSS coordinate at a site satisfying the straight-travel stability. The reference coordinate and the reference orientation, although calculated through the aforementioned process, may be calculated through any other process. For instance, the reference coordinate can be calculated using the moving average of coordinate; moreover, the reference orientation can be calculated using the moving average of orientation. Moreover, the reference coordinate calculation and the reference orientation calculation depend on how much the straight-travel stability is reflected.

If the reference coordinate and the reference orientation have already been recorded in the step S202, the flow moves to direction Y. Then, the next step (step S206) is calculating the positioning coordinates and the positioning orientations as the positioning results of the vehicle using the reference coordinate, the reference orientation, the vehicle speeds, and the angular velocities. The next step (step S207) is checking whether the difference between the instant positioning result as calculated and the instant GNSS coordinates as received falls within a predetermined range. If yes (direction Y), the positioning coordinate and the positioning orientation, which are the positioning result as calculated, are transmitted to the positioning result accumulator 310 (step S208).

Otherwise (direction N), transmitted to the positioning result accumulator 310 is a request to delete positioning-result accumulated data thus far, because the reference position, the reference orientation, and the optimal correction amount thus far require resetting (step S209). In response to the request for deletion, the next step (step S210) is deleting the reference coordinate and the reference orientation that have already been recorded in the positioning result accumulator 310. In this case, the reference coordinate and the reference orientation are recorded again, followed by a positioning process.

An example of the method of GNSS orientation calculation in the step S203 can be the following calculation method.

(GNSS Orientation at Time $t$)=arctan((($Y$-coordinate at time $t$)−($Y$-coordinate at time $t$−1))/(($X$-coordinate at time $t$)−($X$-coordinate at time $t$−1)))    (Expression 1)

It is noted that the X and Y-coordinates denote the GNSS coordinates. It is also noted that t denotes a current time. It is also noted that t−1 denotes a time of previous data reception.

The following determination criterion, for instance, can be used for the determination method in the step S204.

Determination Criterion: (maximum orientation value)−(minimum orientation value)<(orientation threshold $\theta_{th}$) It is noted that the orientation is a value calculated from the GNSS coordinates in the step S203, and, for the value, a value is used that obtained by, for adjustment, adding an integral multiple of 360 degrees to the orientation so that the results of successive two-time calculation do not exceed 180 degrees.

The following set of expressions, for instance, can be used in the method of calculating the positioning result in the step S206.

(Orientation at Time $t$) =     (Set of Expressions 2)

(orientation at time $t$ − 1) +

(angular velocity) × (measurement interval)

($X$-coordinate at Time $t$) =

($X$-coordinate at time $t$ − 1) +

(vehicle's travel distance from time $t$ − 1 to time $t$) × cos(((orientation at time $t$) +

(orientation at time $t$ − 1))/2)

($Y$-coordinate at Time $t$) =

($Y$-coordinate at time $t$ − 1) +

(vehicle's travel distance from time $t$ −

1 to time $t$) × sin(((orientation at time $t$) +

(orientation at time $t$ − 1))/2)

It is noted that the vehicle's travel distance is obtained from the vehicle-speed calculation means 120; and the angular velocity, from the angular-velocity measurement means 130. It is also noted t denotes a current time; and t−1, a time of previous data reception. The orientations in the Description each indicate a direction (angle) in which the vehicle (subject vehicle) is travelling when measured clockwise with a true north direction being set as zero degrees.

The following determination criterion, for instance, can be used in the determination method in the step S207.

Determination Criterion: (distance between GNSS coordinate and positioning result coordinate)<(distance threshold $d_{th}$)

Figure 3:
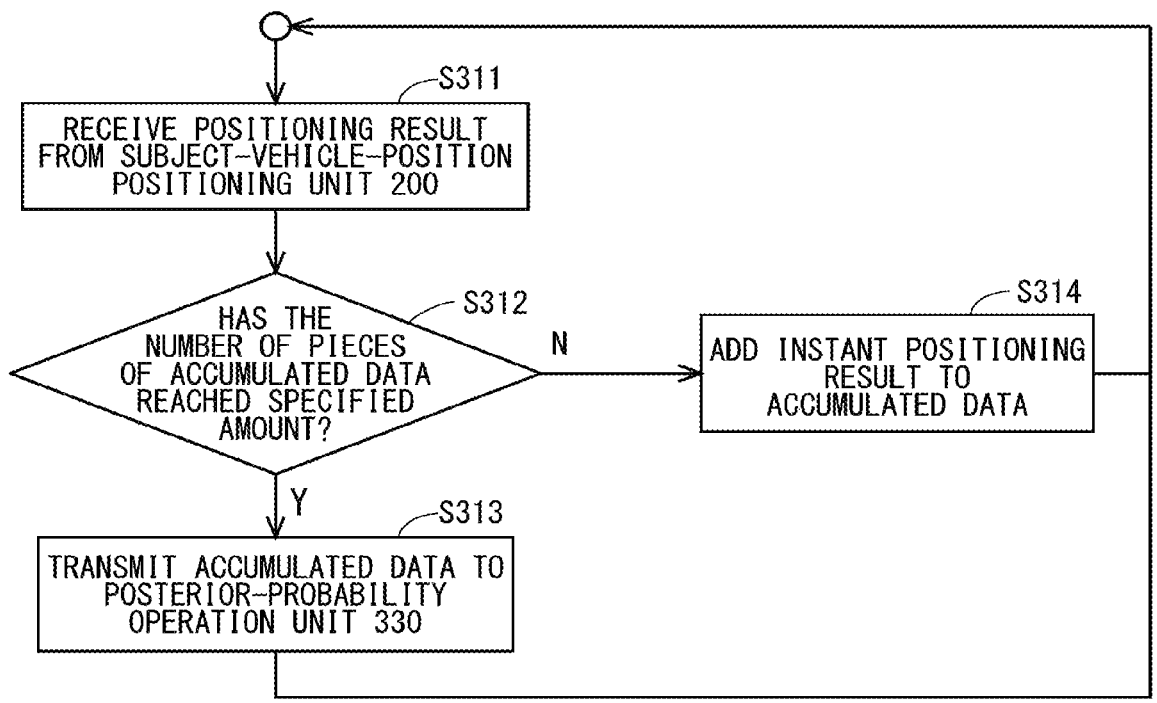
FIG. 3 is a flowchart showing how to work positioning-result storage in a positioning result accumulator of the travel-lane estimation system according to the first embodiment.

FIG. 3 is a flowchart showing how to work positioning-result storage in the positioning result accumulator 310. The positioning result accumulator 310 receives the positioning results from the subject-vehicle-position positioning unit 200 (step S311). To be more specific, the positioning result accumulator 310 receives the time series data of the vehicle's positioning coordinates and the vehicle's positioning orientations, which are the positioning results. The next step (step S312) is checking whether the number of pieces of accumulated data of the positioning results has reached a specified amount. If yes (direction Y), the accumulated data is transmitted to the posterior-probability operation unit 330

(step S313), and then the flow goes back to the initial step. Otherwise (direction N), the instant positioning result received from the subject-vehicle-position positioning unit 200 is added to the accumulated data (step S314), and then the flow goes back to the initial step.

FIG. 4 shows a specific example of intermediate output results in the travel-lane estimation system 1. To be more specific, the drawing shows an example of the reference coordinate and reference orientation, and shows positioning-result accumulated data indicating that the coordinate and the orientation at the time of initial data recording, which is ten o'clock, coincide with the reference coordinate and the reference orientation. The positioning-result accumulated data then shows changes in X-coordinate, Y-coordinate and orientation in time series.

Figure 5:
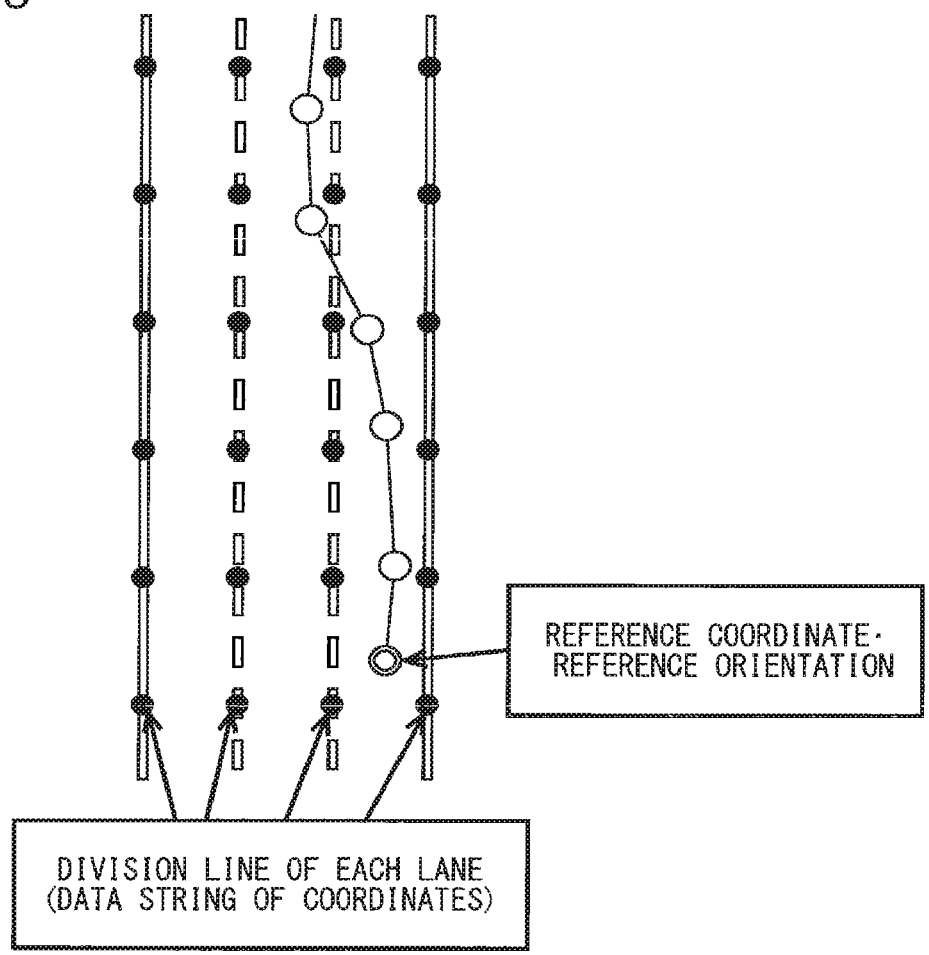
FIG. 5 conceptually illustrates a reference coordinate and a reference orientation, and time series data of positioning coordinates and positioning orientations, in the travel-lane estimation system according to the first embodiment.

FIG. 5 conceptually illustrates the reference coordinate and the reference orientation, and the time series data (indeed, numerical data) of the positioning coordinates and the positioning orientations. The double white circle denotes the reference coordinate and the reference orientation; each white circle, the positioning coordinate and the positioning orientation; and each black circle, the node of the division line of each lane. The white solid lines and white dashed lines each denote the division line of each lane. Each orientation is a vehicle's travelling direction at the corresponding point. For instance, the outside of the division line of the lane, denoted by the white solid line, is, for instance, a roadside or a road shoulder.

The following describes the processing in the correction-amount-candidate generator 320. The correction-amount-candidate generator 320 defines an error range of correctable position and orientation, and lists the correction amount candidates corresponding to the defined error range. The following describes an example of the specific processing.

X, Y, and Θ are stochastic variables, and respectively denote an X-direction error amount, a Y-direction error amount, and an orientation error amount at a path starting point (the oldest record in the positioning-result accumulated data). A path herein means a time series of the positioning results. One possible method is a modeling method in which X, Y, and Θ are presumed to be in conformance with a three-dimensional normal distribution having parameters based on, for instance, GNSS reception accuracy. To be specific, X and Y may be assumed to have an average of zero and a standard deviation $\sigma_{pos}$; moreover, Θ may be assumed to have an average of zero and a standard deviation $\sigma_{dir}$. In addition, X, Y, and Θ may be assumed to be stochastic variables independent of one another, and to be in conformance with the three-dimensional normal distribution. Further, $\sigma_{pos}$ may be determined based on GNSS reception conditions, and $\sigma_{dir}$ may be determined based on the reliability of information that is output from a gyro sensor.

In this case, a correctable position-related range is limited to a range of $-2\sigma_{pos}$ to $+2\sigma_{pos}$; moreover, a correctable orientation-related range is limited to a range of $-2\sigma_{dir}$ to $+2\sigma_{dir}$. This enables the correction amount candidates to be generated while covering a pattern of correction amount that probably occurs (the coverage rate of each variable is about 95.4%). A possible specific method is enumerating all lattice points included in the above ranges and spaced at regular intervals, and then recording the enumerated lattice points as the correction amount candidates.

FIG. 6 shows a specific example of the error patterns in the travel-lane estimation system 1. Here, an X-direction error, a Y-direction error, and an orientation error are shown for each error pattern. How to mark off the error patterns is illustrative; thus the error patterns can be marked off both to a smaller degree and conversely, to a greater degree.

The following describes the processing in the posterior-probability operation unit 330. A posterior probability P (x, y, θ) is calculated for each error pattern, which is the correction amount candidate. To be specific, the posterior probability is calculated using expression 3, and is calculated using the product of the prior occurrence probability of error $P_1(x, y, \theta)$ in conformance with a first probability model and an evaluation value $P_2(x, y, \theta)$ indicating a path likelihood (hereinafter referred to as a "path likelihood") in conformance with a second probability model. To be more specific, the posterior probability P(x, y, θ) is calculated using the product of the prior-occurrence probability $P_1(x, y, \theta)$ of the error pattern (event where the X-direction error is x, the Y-direction error is y, and the orientation error is θ) and the likelihood $P_2(x, y, \theta)$ which is calculated, under the condition that the error pattern has occurred, based on a relative positional relationship between the time series data after correction and the division line. Bayesian inference is applied in this relational expression for use.

$$P(x,y,\theta)=P_1(x,y,\theta) \times P_2(x,y,\theta) \quad \text{(Expression 3)}$$

Here, X, Y, and Θ are stochastic variables, and respectively denote the X-direction correction amount, the Y-direction correction amount, and the orientation correction amount at the path starting point. P(x, y, θ) denotes a posterior probability satisfying x=X, y=Y, and θ=Θ on the evidence of an observed path (the time series data of the positioning results).

The prior occurrence probability of error $P_1(x, y, \theta)$ denotes a probability density function indicating the occurrence of a phenomenon in which the X-direction error amount, the Y-direction error amount, and the orientation error amount are respectively x, y, and θ. One possible method is a modeling method in which X, Y, and Θ are presumed to be in conformance with a three-dimensional normal distribution having parameters based on, for instance, GNSS reception accuracy. In this case, expression 4 provides $P_1(x, y, \theta)$.

$$P_1(x,y,\theta)=((1/(2\pi\sigma_{pos}^2))\cdot(1/(2\pi\sigma_{dir}^2)))^{1/2} \cdot \exp[-x^2/(2\sigma_{pos}^2)-y^2/(2\sigma_{pos}^2)-\theta^2/(2\sigma_{dir}^2)] \quad \text{(Expression 4)}$$

In the framework of Bayesian inference, $P_1(x, y, \theta)$ corresponds to the prior probability of errors x, y, and θ.

The path likelihood $P_2(x, y, \theta)$ is a likelihood calculated, under the condition that a specific error pattern has occurred, on the basis of the relative positional relationship between the time series data after correction using the specific error pattern and the division line. Here, the relative positional relationship between the time series data and the division line includes at least one of a relationship of intersection between line segments linking the time series data and the division line, and a distance-continuation relationship between the time series data and the division line. The line segment linking the time series data herein means a line segment sequentially linking, to one another, the points of the time series data after correction using the error pattern. An example of the line segment is a line segment linking a point at a time (t+α) to a point at a time (t+α+1).

The distance-continuation relationship between the time series data and the division line is a relationship in which the distance between each point of the time series data after correction using the error pattern and the division line (denoted by a line segment and a curve segment) keeps falling within a predetermined range. In this case, an aggregation of the points of the time series data after correction using the error pattern travels within a region (lane) sandwiched between, a certain division line and a division line adjacent thereto excluding a time period during which a lane change occurs. In addition, the lines, linking the time series data never intersects theses division lines line excluding a time period during which a lane change occurs. Moreover, the case where, for instance, the points of the time series data after correction using the error pattern merely overlap these division lines rather than intersect these division lines, can be handled as being included in the distance-continuation relationship between the time series data and the division line.

Examples of the relationship (event) in which the line linking the time series data intersect the division line include the following seven events: <1> travelling into the outside of a road (the outside of the division line of the road), <2> straddling the division line of the lane several times for a short time period, <3> a gentle lane change, <4> a lane change in a lane-change prohibition section, <5> a lane change that does, not involve driver's operation of a direction indicator, <6> a lane change that does not involve driver's change of the rudder angle of a steering wheel, and <7> a lane change does not involve camera's detection of white-line crossing. Meanwhile, examples of the distance-continuation relationship (event) between the time series data and the division line include the following two events: <8> continuous, leftward or rightward travelling within the lane, and <9> continuous, stable travelling in the center of the lane.

Figure 7:
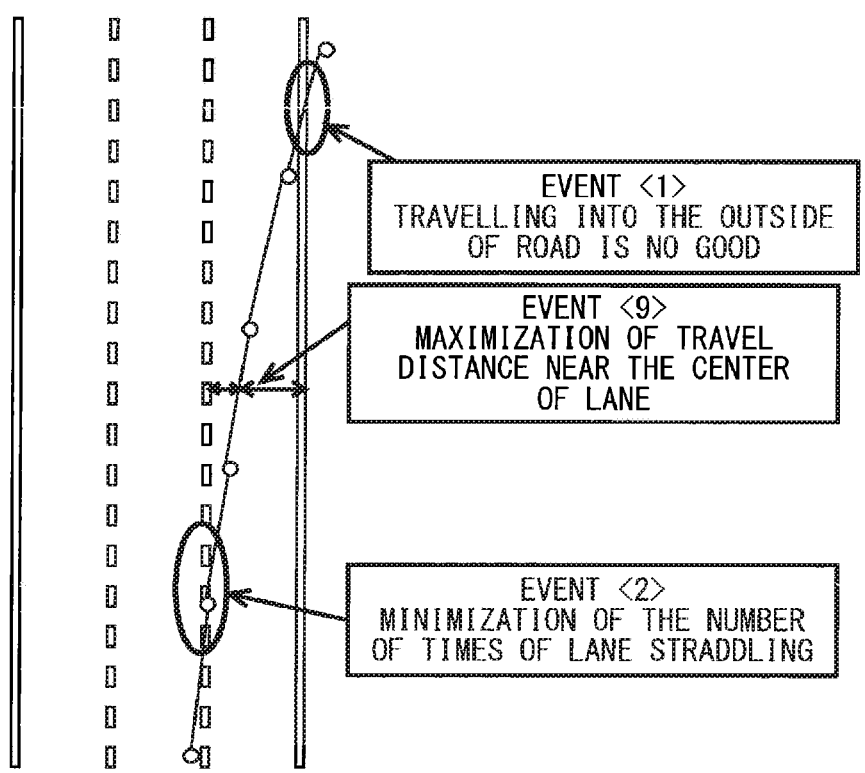
FIG. 7 conceptually illustrates events in the travel-lane estimation system according to the first embodiment.

FIG. 7 conceptually illustrates events, and more specifically, is a conceptual diagram of some of the aforementioned events for specific description. For instance, for event <1>, i.e., travelling into the outside of a road (the outside of the division line of the road), the drawing shows that traveling into the outside of the road is no good. Further, for event <2>, i.e., straddling the division line of the lane several times for a short time period, the drawing shows the minimization of the number of times of lane straddling. Still further, for event <9>, i.e., continuous, stable travelling in the center of the lane, the drawing shows the maximization of a travel distance near the center of the lane.

For instance, for event <4>, i.e., a lane change in a lane-change prohibition section, the detailed shaped of each lane stored in the map information storage 50 also includes information that the lane is a change prohibition section. Further, for event <5>, i.e., a lane change that does not involve driver's operation of a direction indicator, required is a means for accessing operational information about the direction indicator. Still further, for event <6>, i.e., a lane change that does not involve driver's change of the rudder angle of a steering wheel, required is a means for accessing information about the rudder angle of the steering wheel. Yet further, for event <7>, i.e., a lane change does not involve camera's detection of white-line crossing, required is a white-line-crossing detection means for detecting whether the vehicle has crossed a white line using a camera.

The path likelihood $P_2(x, y, \theta)$ shows the evaluation value (likelihood) indicating the likelihood of the observed path that has undergone correction based on error amounts (error pattern) x, y, and $\theta$. When the path likelihood $P_2(x, y, \theta)$ is calculated, reflected are events, such as the following: <1> travelling into the outside of a road; <2> straddling the division line of the lane several times for a short time period; <3> a gentle lane, change; <4> a lane change in a lane-change prohibition section; <5> a lane change that does not involve, driver's operation of a direction indicator; <6> a lane change at does not involve driver's change of the rudder angle of a steering wheel; <7> a lane change does not involve camera's detection of white-line crossing; and <8> continuous, leftward or rightward travelling within the lane, to reduce the probability of occurrence according to the frequency and degree of occurrence of the events. It is noted that although many events are desirably presumed as the relative positional relationship between the time series data after correction and the division line, a single event alone enables the posterior probability $P(x, y, \theta)$ to be calculated, thus establishing the present invention.

To be specific, a presumable method of calculating the path likelihood $P_2(x, y, \theta)$ is provided below. It is noted that the numerals within angle brackets correspond to the respective events. For instance, <1> a stochastic process of the number of road departures can be regarded as being in conformance with a Poisson process having an average interval of $1/\lambda_{dev}(\ll 1)$. Likewise, <2> a stochastic process of the number of lane changes can be regarded as being in conformance with a Poisson process with an average interval of $1/\lambda_{chg}$. <3> Yaw angles with respect to lanes in lane change can be regarded as stochastic variables that are in conformance with a normal distribution with an average $\mu_{yaw}$ and a standard deviation $\sigma_{yaw}$ and are independent of one another. <4> The probability of lane change in the lane-change prohibition section is given as $p_{prh}$; in addition, departures in vehicle travel position from a lane center line can be regarded as stochastic variables that are in conformance with a normal distribution with a zero average and a standard deviation $\sigma_{cen}$ and are independent of one another. <5> A time interval from a time point of lane change to a time point of operating the direction indicator toward the same direction as a lane change that is the closest in time, can be regarded as being in conformance with an exponential distribution with an average of $1/\lambda_{win}$. <6> A time interval from a time point of lane change to a time point of operating the rudder angle of the steering wheel toward the same direction as a lane change that is the closest in time, can be regarded as being in conformance with an exponential distribution with an average of $1/\lambda_{hnd}$. <7> A time interval from a time point of lane change to a time point of camera's detection of the white-line crossing toward the same direction as a lane change that is the closest in time, can be regarded as being in conformance with an exponential distribution with an average of $1/\lambda_{cam}$. <8> A distance from a lane center line can be regarded as being in conformance with a normal distribution with a zero average and a standard deviation $\sigma_{cen}$. Accordingly, the path likelihood $P_2(x, y, \theta)$ is formulated as shown in the following expression 5:

$$P_2(x,y,\theta)=P_{2A}(x,y,\theta) \times P_{2B}(x,y,\theta) \times P_{2C}(x,y,\theta) \times P_{2D}(x,y,\theta) \times P_{2E}(x,y,\theta) \times P_{2F}(x,y,\theta) \times P_{2G}(x,y,\theta) \times P_{2H}(x,y,\theta)$$ (Expression 5).

Here, $$P_{2A}(x,y,\theta)=\exp[-\lambda_{dev} \cdot t] \cdot (\lambda_{dev} \cdot t)^d/(d!)$$

$$P_{2B}(x,y,\theta)=\exp[-\lambda_{chg} \cdot t] \cdot (\lambda_{chg} \cdot t)^k/(k!)$$

$$P_{2C}(x,y,\theta)=\Pi_{i=1}^k (1/(2\mu\sigma_{yaw}^2))^{1/2} \cdot \exp[-(w(i)-\mu_{yaw})^2/(2\sigma_{yaw}^2)]$$

$$P_{2D}(x,y,\theta)=\Pi_{i=1}^k (p(i))$$

$$P_{2E}(x,y,\theta)=\Pi_{i=1}^k \exp[-\lambda_{win} \cdot t_1(i)]$$

$$P_{2F}(x,y,\theta)=\Pi_{i=1}^k \exp[-\lambda_{hnd} \cdot t_2(i)]$$

$$P_{2G}(x,y,\theta)=\Pi_{i=1}^{k}\exp[-\lambda_{cam}\cdot t_3(i)]$$

$$P_{2H}(x,y,\theta)=\Pi_{j=1}^{n}(1/(2\pi\alpha_{cen}^2))^{1/2}\cdot\exp[-(1(j))^2/(2\sigma_{cen}^2)]$$

$P_{2A}(x, y, \theta)$ in expression 5 reflects the frequency of occurrence of event <1>, i.e., travelling into the outside of the road (the outside of the division line of the road). Likewise, $P_{2B}(x, y, \theta)$ reflects the frequency of occurrence of event <2>, i.e., a lane change (i.e., straddling a division line). $P_{2C}(x, y, \theta)$ reflects the frequency of occurrence of event <3>, i.e., a gentle lane change. $P_{2D}(x, y, \theta)$ reflects the frequency of occurrence of event <4>, i.e., a lane change in a lane-change prohibition section. $P_{2E}(x, y, \theta)$ reflects the frequency of occurrence of event <5>, i.e., a lane change that does not involve driver's operation of a direction indicator. $P_{2F}(x, y, \theta)$ reflects the frequency of occurrence of event <6>, i.e., a lane change that does not involve driver's change of the rudder angle of, a steering wheel. $P_{2G}(x, y, \theta)$ reflects the frequency of occurrence of event <7>, i.e., a lane change does not involve camera's detection of white-line crossing. $P_{2H}(x, y, \theta)$ reflects the frequency of occurrence of event <8>, i.e., continuous, leftward or rightward travelling within the lane.

Here, d denotes the number of road departures in a path after correction; moreover, k denotes the number of lane changes in the path after correction. Further, p(i) is a function sending back $p_{prh}$ when an $i^{th}$ lane change occurs in the lane-change prohibition section; otherwise, sending back 1. Still further, w(i) denotes a yaw angle at the time of an $i^{th}$ lane change. Yet further, $t_1(i)$ denotes a time interval from a time point of $i^{th}$ lane change to a time point of operating the direction indicator toward the same direction as a lane change that is the closest in time. Still yet further, $t_2(i)$ denotes a time interval from a time point of $i^{th}$ lane change to a time point of operating the rudder angle of the steering wheel toward the same direction as a lane change that is the closest in time. Still further, $t_3(i)$ denotes a time interval from a time point of $i^{th}$-time lane change to a time point of camera's detection of white-line crossing toward the same direction as a lane change that is the closest in time. Yet further, n denotes the number of observed coordinates; moreover l(j) denotes a vertical distance from a $j^{th}$ observation point to the center line of a lane to which the $j^{th}$ observation point belongs.

It is noted that $\lambda_{dev}$, $\lambda_{chg}$, $\mu_{yaw}$, $\sigma_{yaw}$, $p_{prh}$, $\lambda_{win}$, $\lambda_{hnd}$, $\lambda_{cam}$, and $\sigma_{cen}$ are parameters, and may be calculated based on past records, such as travel probe data, in addition to the use of a method of setting a constant. Further, parameter adjustment based on driver's personal travel records in the past enables more accurate determination of lane change that reflects personal driving features to be detected.

Meanwhile, attention is drawn to the fact that d, k, p(i), w(i), $t_1(i)$, $t_2(i)$, $t_3(i)$, n, and l(j), which are numeric values calculated from the path after correction using errors x, y, and θ, rely on the observed path and are functions of x, y, and θ as well.

In addition, x, y, and θ are correction amounts with respect to the reference coordinate and the reference orientation, which are the path starting point (the oldest record of the data stored in the positioning result accumulator 310). Thus, calculating a relative position vector from the path starting point with respect to a coordinate before correction, making a rotation at a rotation angle of θ with respect to the relative position vector, and adding off-sets x and y, change the relative position vector into an absolute position vector. Accordingly, a coordinate after correction is obtained. All the records in the positioning result accumulator 310 undergo this process, thereby obtaining a path after correction.

In the specific example of expression 5, the stochastic process of the number of road departures is regarded as being in conformance with the Poisson process having an average of $\lambda_{dev}$(<<1) as shown in <1>. However, when one or more road departures occur, modeling that unconditionally satisfies $P_2(x, y, \theta)=0$ is possible as well.

For the operation processing of the prior probability, the path likelihood, and the posterior distribution using a calculator, X, Y, and Θ may be regarded as discrete random variables, and $P_1(x, y, \theta)$ may be replaced as a discrete probability distribution.

Figure 8:
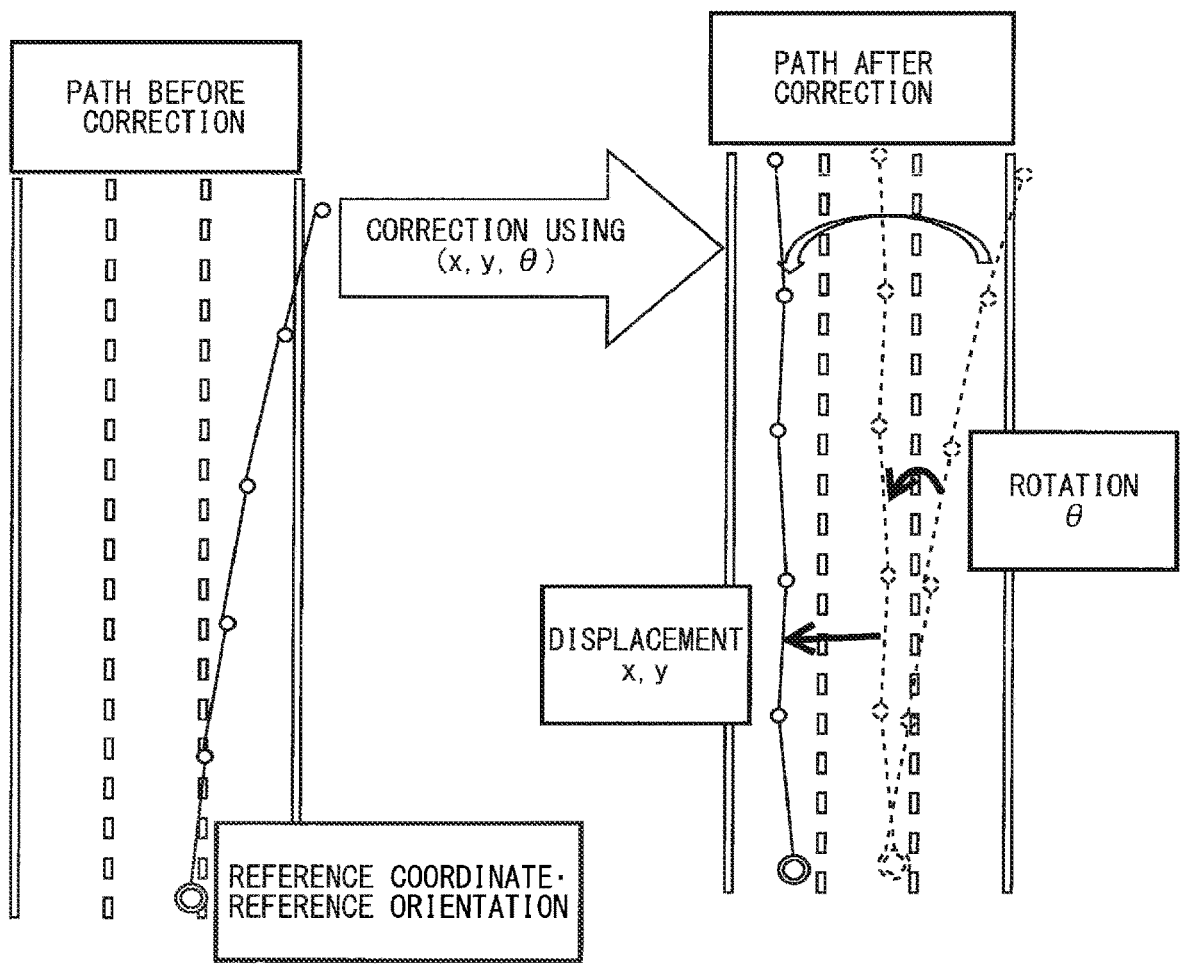
FIG. 8 conceptually illustrates paths before and after correction in the travel-lane estimation system according to the first embodiment.

FIG. 8 conceptually illustrates the paths before and after correction. To be more specific, the path before correction is on the left side of the drawing; and the path after correction, on the right side of the drawing. The double white circles each denote the reference coordinate and the reference coordinate. The white circles each denote the positioning coordinate and the positioning orientation. In the illustration of the path after correction, a path, which is the time series data of the positioning results, as well as the reference coordinate and the reference orientation is corrected through rotation (orientation correction) with θ and through displacement (coordinate correction) with x and y.

FIG. 9 shows a specific example of positioning-result accumulated data before and after correction. To be more specific, the drawing shows that the reference coordinate and the reference orientation are corrected, and that the positioning-result accumulated data indicating that the coordinate and orientation at the time of initial data recording, which is ten o'clock, coincide with the correction of the reference coordinate and reference orientation. In the positioning-result accumulated data, each piece of recorded data is corrected using the same error pattern as that in the reference coordinate and the reference orientation. Nevertheless, corrections through rotation (orientation correction) with θ are made; hence, the X-coordinates and Y-coordinates do not consist of values that have undergone mere regulation.

In the framework of Bayesian inference, $P_2(x, y, \theta)$ corresponds to the probability of occurrence of an event observed under the condition that errors x, y, and θ are assumed.

The following describes the processing in the optimal-correction-amount operation unit 340. The optimal-correction-amount operation unit 340 calculates an optimal correction amount candidate (x^, y^, θ^) having the highest posterior probability P(x, y, θ) among the correction amount candidates (x, y, θ), which are a plurality of error patterns generated in the correction-amount-candidate generator 320, the posterior probability P(x, y, θ) being calculated in the posterior-probability operation unit 330. That is, calculated, as an optimal correction amount (x^, y^, θ^), is an error pattern having a posterior probability P(x, y, θ) that is the highest, the posterior probability P(x, y, θ) being calculated with the product of the prior occurrence probability $P_1(x, y, \theta)$ of the time series data by the plurality of error patterns and the likelihood $P_2(x, y, \theta)$ which is calculated, under the condition that the error pattern has occurred, on the basis of the relative positional relationship between the time series data after correction and the division line.

In the framework of Bayesian inference, P(x, y, θ) corresponds to the posterior probabilities of errors x, y, and θ (multiplied by constants). Thus, a correction amount candidate (x^, y^, θ^) having the highest posterior probability P(x, y, θ) indicates an estimation result obtained through Bayesian inference, on the evidence of the observed path.

FIG. 10 shows a specific example of the optimal correction amount. To be more specific, the drawing shows posterior probability data calculated in the posterior-probability operation unit 330, and the optimal correction amount selected in the optimal-correction-amount operation unit 340. In this example, error pattern No4 has the highest posterior probability.

The following describes the processing in the travel-lane estimation unit 350. The travel-lane estimation unit 350 applies the optimal correction amount, calculated in the optimal-correction-amount operation unit 340, to the positioning-result accumulated data, held by the positioning result accumulator 310. The path after correction is calculated in a manner similar to those mentioned earlier. Subsequently, a comparison is made between the path after correction using the optimal correction amount, and a travelable region of each lane sectioned by lane division lines, the travelable region being provided from a map information storage 50. This is because that the comparison enables the calculation of a correction amount reflecting feasibility of a travel method with respect to the division lines contained in the map information. Estimated is a travel lane in accordance with which travelable region of the lane the path after correction belongs to among the lane regions sectioned by the lane division lines. This is because that the estimation enables the occurrence of a lane change and the direction of the lane change (right or left) to be detected. This result is output as a travel-lane estimation result.

Furthermore, after the processing in the travel-lane estimation unit 350 is completed, a single record that is the latest in the positioning-result accumulated data held by the positioning result accumulator 310, is recorded again as the reference coordinate and the reference orientation; then, all the records in the positioning-result accumulated data are deleted.

As described above, the travel-lane estimation system includes the following: a GNSS receiver configured to receive a coordinate of a vehicle through a GNSS; a vehicle-speed calculation means for calculating a vehicle speed from a travel distance of the vehicle; an angular-velocity measurement means for measuring an angular velocity from an amount of change in vehicle's orientation; a subject-vehicle-position positioning unit configured to calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity; a map information storage configured to store map information including positional information about a division line of a lane; and a lane estimation unit configured to calculate, as an optimal correction amount, an error pattern having a posterior probability that is the highest among a plurality of error patterns, correct the time series data using the optimal correction amount, and compare the time series data as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line.

The travel-lane estimation system determines the posterior probability using the positional information about the division line of each lane, and corrects the posterior probability using the optimal correction amount. This enables, from a vehicle's trace, accurate lane-change detection and accurate estimation of a current travel lane. In addition, the travel-lane estimation system enables the occurrence of a lane change and the direction of the lane change (right or left) to be detected.

The relative positional relationship between the time series data and the division line includes at least one of the relationship of intersection between the line linking the time series data and the division line, and the distance-continuation relationship between the time series data and the division line. Furthermore, the error pattern is the combination of a coordinate error and an orientation error.

A navigation system using the travel-lane estimation system enables a lane on which the subject vehicle is travelling to be grasped, thereby providing more suitable instructions, such as announcements. In addition, using the travel-lane estimation system facilitates automated driving, driving assist function, and other things.

Second Embodiment

Figure 11:
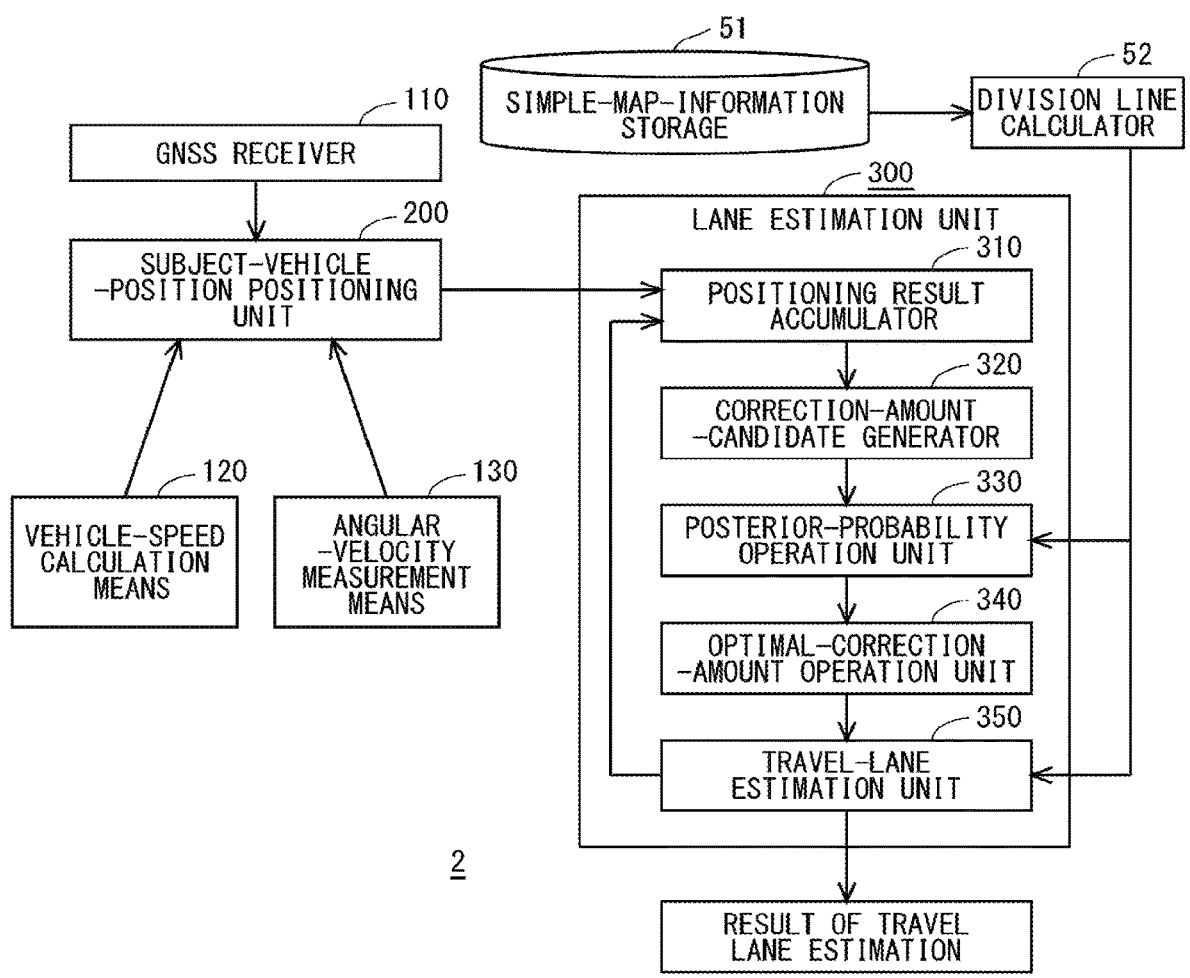
FIG. 11 is a diagram illustrating the configuration of a travel-lane estimation system according to a second embodiment.

FIG. 11 is a diagram illustrating the configuration of a travel-lane estimation system 2 according to a second embodiment. Unlike the travel-lane estimation system 1 according to the first embodiment, the travel-lane estimation system 2 includes a simple-map-information storage 51 and a division line calculator 52 instead of the map information storage 50. The travel-lane estimation system 2 is configured in the same manner as the travel-lane estimation system 1 with the exception that the simple-map-information storage 51 and the division line calculator 52 are substituted for the map information storage 50, which stores the map information including the positional information about the division line of each lane.

The GNSS receiver 110, the vehicle-speed calculation means 120, the angular-velocity measurement means 130, the subject-vehicle-position positioning unit 200, the positioning result accumulator 310, the correction-amount-candidate generator 320, the posterior-probability operation unit 330, the optimal-correction-amount operation unit 340, the travel-lane estimation unit 350, and the lane estimation unit 300, are configured and operate in a manner similar to those in the first embodiment. Accordingly, the description of these configurations and operations will not be elaborated upon here. Mainly described hereinafter is the differences between the first embodiment and the second embodiment.

The simple-map-information storage 51 fails to store positional information about a division line of each lane, whereas the map information storage 50 stores the map information including at least the positional information about the division line of each lane. The simple-map-information storage 51 stores map information including information about node coordinates, forming a road link, a road width, the number of lanes, and a travelable direction. Although common map information for navigation seems to include at least the information about the node coordinates, forming the road link, and the travelable direction, the simple-map-information storage 51 necessarily requires the information about the road width and the number of lanes in addition to the aforementioned information.

The simple-map-information storage 51 includes a storing medium storing the map information including the information about the node coordinates, forming the road link, the road width, the number of lanes, and the travelable direction, and the simple-map-information storage 51 is composed of an HDD, a Memory Stick, and other things. It is noted that the node coordinates include auxiliary node coordinates that are interpolating coordinates necessary for displaying a road shape, such as a curve, on the screen of a car navigation system even when a road never intersects other roads.

The division line calculator 52 calculates the division line of each lane from the map information in the simple-map-information storage 51. For instance, dividing the width, W, of the road by the total number of lanes, N, of the road enables the width of each lane, w=W/N, to be calculated. Next, adding a lateral distance, [−(N/2)×w, (−(N/2)+1)× w, . . . , (N/2−1)×w, (N/2)×w], to the center of the road link, which links the node coordinates, enables positional information about (N+1) number of division lines sectioning each lane to be calculated. This is only one example; thus the positional information about the division line of each lane can be calculated through any other method with the information about the node coordinates, forming the road link, the road width, the number of lanes, and the travelable direction.

The positional information about the division line of each lane is obtained from the division line calculator 52. Accordingly, the posterior-probability operation unit 330 and the travel-lane estimation unit 350 enable calculation and estimation similar to those in the first embodiment. This achieves an effect similar to that in the first embodiment. In the drawing, identical or corresponding components are denoted by the same signs, which is applied to the whole text of the Description and the whole drawings. Further, the components in, the whole text of the Description are described in illustrative form, and thus are not restrictive.

The travel-lane estimation system 2 enables map information used in a navigation system to be used as it now stands, and enables a lane on which a subject vehicle is travelling to be, grasped. This facilitates providing more suitable instructions, such as announcements. In addition, the travel-lane estimation system 2 facilitates travel lane estimation in automated driving.

As described above, the travel-lane estimation system includes the following: a GNSS receiver configured to receive a coordinate of a vehicle through a GNSS; a vehicle-speed calculation means for calculating a vehicle speed from a travel distance of the vehicle; an angular-velocity measurement means for measuring an angular velocity from an amount of change in vehicle's orientation; a subject-vehicle-position positioning unit configured to calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity; a simple-map-information storage configured to store map information including information about node coordinates forming a road link, a road width, the number of lanes, and a travelable direction; a division line calculator configured to calculate a division line of a lane from the map information; and a lane estimation unit configured to calculate, as an optimal correction amount, an error pattern having a posterior probability that is the highest among a plurality of error patterns, correct the time series data using the optimal correction amount, and compare the time series data as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line. This enables, from a vehicle's trace, accurate detection of a lane change and accurate estimation of a current travel lane.

The relative positional relationship between the time series data and the division line includes at least one of a relationship of intersection between a line linking the time series data and the division line, and a distance-continuation relationship between the time series data and the division line. Furthermore, the error pattern is a combination of a coordinate error and an orientation error.

Third Embodiment

The travel-lane estimation system 1 according to the first embodiment uses the X-coordinate, Y-coordinate, and orientation as an error pattern. In a third embodiment, only the orientation is used as an error pattern. In other words, the error pattern in the third embodiment is only an orientation error, whereas the error pattern in the first embodiment is the combination of the coordinate error and the orientation error.

Figure 12:
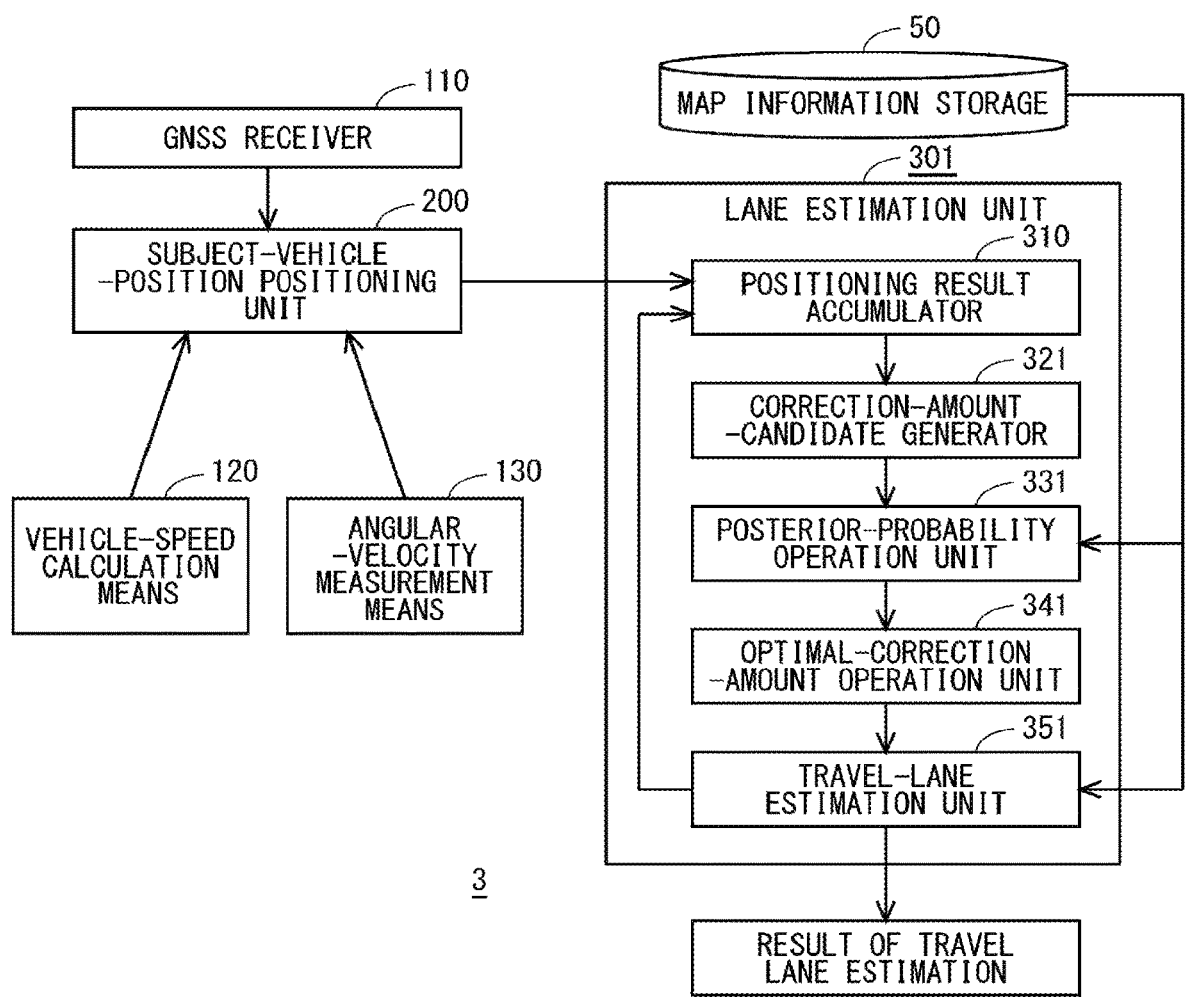
FIG. 12 is a diagram illustrating the configuration of a travel-lane estimation system according to a third embodiment.

FIG. 12 is a diagram illustrating the configuration of a travel-lane estimation system 3 according to the third embodiment. Only the error pattern in the third embodiment is different from that in the first embodiment. Accordingly, a correction-amount-candidate generator 321, a posterior-probability operation unit 331, an optimal-correction-amount operation unit 341, a travel-lane estimation unit 351, and a lane estimation unit 301 are different from the corresponding components in the first embodiment. Meanwhile, the map information storage 50, the GNSS receiver 110, the vehicle-speed calculation means 120, the angular-velocity, measurement means 130, the subject-vehicle-position positioning unit 200, and the positioning result accumulator 310 are configured and operate in a manner similar to those in the first embodiment, and thus, will not be elaborated upon here. Mainly described hereinafter is the differences between the third and, first embodiments.

The subject-vehicle-position positioning unit 200 calculates time series data of positioning coordinates of a vehicle and positioning orientations of the vehicle from a reference coordinate, a reference orientation, a vehicle speed, and an angular velocity. The positioning result accumulator 310 stores, as the time series data, the positioning coordinates and the positioning orientations, which are positioning results obtained from the subject-vehicle-position positioning unit 200 at individual times, in order of occurrence, and deletes the data sequentially from the oldest one when a buffer reaches its upper limit.

FIG. 13 shows a specific example of error patterns. Unlike FIG. 6, FIG. 13 omits X-direction errors and Y-direction errors, and thus shows only orientation errors θ, as error patterns. In the correction-amount-candidate generator 320 in the first embodiment, error occurrence relating to three variables: X, Y, and Θ, is presumed. In the correction-amount-candidate generator 321 in the third embodiment, error occurrence relating to only orientation, Θ, is presumed. The correction-amount-candidate generator 321 first calculates an error distribution of the positioning orientation on the basis of the accuracy of GNSS reference-coordinate reception. The correction-amount-candidate generator 321 then determines a range of error such that the probabilities that the positioning orientations fall within a predetermined range exceed a previously specified threshold, and the correction-amount-candidate generator 321 generates a pattern of orientation error falling within the determined range.

The posterior-probability operation unit 331 calculates a posterior probability indicating a quantitative feasibility on every correction amount candidate generated in the correction-amount-candidate generator 321. To be more specific, the posterior-probability operation unit 331 first calculates a prior occurrence probability of the time series data by every error pattern generated in the correction-amount-candidate generator 321. The posterior-probability operation unit 331 then calculates a posterior probability calculated with the product of the calculated prior occurrence probability and a likelihood (evaluation value indicating the likelihood of the time series data) calculated, under a condition that the error pattern has occurred, on the basis of a relative positional relationship between the time series data after correction and a division line.

To be more specific, the posterior probability, $P(\theta)$, is calculated using the product of the prior occurrence probability, $P_1(\theta)$ of the error pattern (event where an orientation error is $\theta$) and the likelihood, $P_2(\theta)$ which is calculated, under the condition that the error pattern has occurred, based on the relative positional relationship between the time series data after correction and the division line. Bayesian inference is applied in this relational expression for use.

The path likelihood $P_2(\theta)$ is a likelihood calculated, under the condition that a specific error pattern has occurred, on the basis of the relative positional relationship between the time series data after correction using the specific error pattern and the division line. Here, the relative positional relationship between the time series data and the division line includes at least one of a relationship of intersection between a line linking the time series data and the division line, and a distance-continuation relationship between the time series data and the division line. Here, the line linking the time series data is a line sequentially linking, to one another, the points of the time series data after correction using the error pattern. An example of such a line is a line linking a point at a time $(t+\alpha)$ to a point at a time $(t+\alpha+1)$.

The distance-continuation relationship between the time series data and the division line is a relationship in which the distances between the points of the time series data after correction using the error pattern and the division line (denoted by a line segment and a curve segment) keep falling within a predetermined range. In this case, an aggregation of the points of the time series data after correction using the error pattern are positioned within a region sandwiched between a certain division line and a division line adjacent thereto excluding a time period during which a lane change occurs. In addition, the line linking the time series data never intersects theses division lines excluding a time period during which a lane change occurs. Moreover, the case where, for instance, the points of the time series data after correction using the error pattern merely overlap these division lines rather than intersect these division lines, can be as being included in the distance-continuation relationship, between the time series data and the division line. It is noted that although many events are desirably presumed as the relative positional relationship between the time series data after correction and the division line, a single event alone enables the posterior probability $P(\theta)$ to be calculated, thus establishing the present invention.

The posterior-probability operation unit 331 uses an orientation correction amount alone as a variable. Hence, $P(\theta)$ is calculated through expression 6, for instance.

$$P(\theta)=P_1(\theta)\times P_2(\theta) \quad \text{(Expression 6)}$$

$$P_1(\theta)=(1/(2\pi\sigma_{dir}^2))^{1/2}\cdot\exp[-\theta_2/(2\sigma_{dir}^2)]$$

$$P_2(\theta)=P_{2A}(\theta)\times P_{2B}(\theta)\times P_{2C}(\theta)\times P_{2D}(\theta)\times P_{2E}(\theta)\times P_{2F}(\theta)\times P_{2G}(\theta)\times P_{2H}(\theta)$$

$$P_{2A}(\theta)=\exp[-\lambda_{dev}\cdot t]\cdot(\lambda_{dev}\cdot t)^d/(d!)$$

$$P_{2B}(\theta)=\exp[-\lambda_{chg}\cdot t]\cdot(\lambda_{chg}\cdot t)^k/(k!)$$

$$P_{2C}(\theta)=\Pi_{i=1}^{k}(1/(2\pi\sigma_{yaw}^2))^{1/2}\cdot\exp[-(w(i)-\mu_{yaw})^2/(2\sigma_{yaw}^2)]$$

$$P_{2D}(\theta)=\Pi_{i=1}^{k}(p(i))$$

$$P_{2E}(\theta)=\Pi_{i=1}^{k}\exp[-\lambda_{win}\cdot t_1(i)]$$

$$P_{2F}(\theta)=\Pi_{i=1}^{k}\exp[-\lambda_{hnd}\cdot t_2(i)]$$

$$P_{2G}(\theta)=\Pi_{i=1}^{k}\exp[-\lambda_{cam}\cdot t_3(i)]$$

$$P_{2H}(\theta)=\Pi_{j=1}^{n}(1/2\pi\sigma_{cen}^2)^{1/2}\cdot\exp[-(l(j))^2/(2\sigma_{cen}^2)]$$

Here, the meanings of $P_1$, $P_2$, $P_{2A}$ to $P_{2H}$, d, k, p(i), w(i), $t_1(i)$, $t_2(i)$, $t_3(i)$, n, and l(j) are similar to those in expression 5.

It is noted that $\theta$ is a correction amount with respect to a path starting point (the oldest record in the positioning-result accumulated data). Thus, a relative position vector from the path starting point is calculated with respect to a coordinate before correction. Making a rotation at a rotation angle of $\theta$ with respect to the relative position vector and changing into an absolute position. Accordingly, a coordinate after correction is obtained. All the records in the positioning result accumulator 310 undergo this process, thereby obtaining a path after correction. Likewise, obtained in the travel-lane estimation unit 351 is a coordinate after correction reflecting a rotation angle of $0^\wedge$ alone.

FIG. 14 shows a specific example of positioning-result accumulated data before and after correction. To be more specific, the drawing shows the reference coordinate and reference orientation are corrected, and that the positioning-result accumulated data indicating that the coordinate and the orientation at the time of initial data recording, which is ten o'clock, coincide with the correction of the reference coordinate and the reference orientation. In the positioning-result accumulated data, each piece of recorded data is corrected using the same error pattern as that in the reference orientation. Nevertheless, corrections through rotation (orientation correction) with $\theta$ are made; hence, a reference X-coordinate and a reference Y-coordinate each have a value that varies between pre-correction and post-correction.

The optimal-correction-amount operation unit 341 calculates, as an optimal correction amount (a rotation angle of $\theta^\wedge$), an error pattern having the highest posterior probability on the basis of the operation result of the posterior probability of the error pattern, which is each correction amount candidate, calculated in the posterior-probability operation unit 331.

In other words, the optimal-correction-amount operation unit 341 calculates an optimal correction amount candidate $\theta^\wedge$ having the highest posterior probability $P(\theta)$ among the correction amount candidates $\theta$, which are a plurality of error patterns generated in the correction-amount-candidate generator 321, posterior probability $P(\theta)$ being calculated in the posterior-probability operation unit 331. That is, the optimal-correction-amount operation unit 341 calculates, as the optimal correction amount $\theta^\wedge$, the error pattern having the highest posterior probability $P(\theta)$ calculated with the product of the prior occurrence probability $P_1(\theta)$ of the time series data by the plurality of error patterns, and a likelihood $P_2(\theta)$ which is calculated, under the condition that the error pattern has occurred, on the basis of the relative positional relationship between the time series data after correction and the division line.

In the framework of Bayesian inference, P(θ) corresponds to the posterior probability of an error θ (multiplied by a constant); thus, a correction amount candidate θ^ having the highest the posterior probability P(θ) indicates an estimation result obtained through Bayesian inference on the evidence of an observed path.

FIG. 15 shows a specific example of the optimal correction amount. FIG. 15 shows X-direction errors and Y-direction errors as well for emphasizing that the X-direction and Y-direction errors are all zero, unlike the corresponding drawing the in first embodiment. In this specific example, pattern 3 has the highest posterior probability P(θ).

The travel-lane estimation unit 351 employs the optimal correction amount (most likely correction amount), calculated in the optimal-correction-amount operation unit 341, corrects the time series data using the optimal correction amount, and compares the corrected time series data with the division line, to thus estimate a vehicle's travel lane. After the processing in the travel-lane estimation unit 351 is completed, a single record that is the latest in the positioning-result accumulated data held by the positioning result accumulator 310, is recorded again as the reference coordinate and the reference orientation. Then, all the records in the positioning-result accumulated data are deleted.

The processing in the travel-lane estimation unit 351 will be described in a more specific manner. The travel-lane estimation unit 351 first applies the optimal correction amount, calculated in the optimal-correction-amount operation unit 341, to the positioning-result accumulated data, held by the positioning result accumulator 310, to thus calculate the path after correction. The path after correction is calculated in a manner similar to that described in the first embodiment. The travel-lane estimation unit 351 compares the path after correction with the division line to estimate the vehicle's travel lane.

An example of the other processing in the travel-lane estimation unit 351 is that the travel-lane estimation unit 351 compares the positional information about the division line of the lane, provided from the map information storage 50, with the path after correction using the optimal correction amount, to calculate a movement amount in a transverse direction with respect to the lane (i.e., a lateral-movement amount) from the starting point of the path after correction to the end point of the path after correction. For instance, the lateral-movement amount contains a positive movement, which is a rightward movement, and a negative movement, which is a leftward movement. The vehicle's travel lane can be estimated by cumulating (totalizing) the lateral-movement amounts and comparing the cumulated lateral movement amounts with the division, line.

The following illustrates how to cumulate the lateral-movement amounts. The width of each lane is assumed to be 3.5 m. Let previous travel-lane estimation provide a result, "the second lane from the left, and 2.0 m left from the center line of the second lane", and a current lateral-movement amount be "3.5 m left". In this case, a travel lane is determined to have been changed from the second lane from the left, to the first lane from the left; in addition, current travel-lane estimation provides a result, "the first lane from the left, and 2.0 m left from the center line of the first lane".

The shapes of adjacent lanes of the same road often strongly resemble each other in view of the actual road shape of, for instance, an expressway (high-standard road). Hence, if the three variables: x, y, and θ were corrected, correctly calculating the correction amounts of x and y would be difficult, and correctly detecting a lane on which a vehicle is travelling from a coordinate after correction indicating a subject-vehicle's position alone would be difficult. For instance, the vehicle can be determined to keep travelling on the second lane even when it actually keeps travelling on the first lane. This problem means that correct detection of positional off-set amounts x and y is difficult, and that accurate estimation of an orientation error amount θ is important to detect not a travel lane (lane number), but a lane change (movement amount). As such, intensive introduction of calculation resources for the detection of an orientation off-set amount θ can achieve highly accurate calculation in the high-standard road.

A travel lane for entry into the main track of the high-standard road is uniquely defined in most cases. For instance, the vehicle is travelling on a left-side lane without exception when entering the high-standard road from an interchange having such a shape as to merge into the main track of the high-standard road from the left. Accordingly, the fact is obvious that the vehicle is travelling on the leftmost lane at the time of entry into the main track of the high-standard road. Moreover, cumulating the lateral-movement amounts, detected by the travel-lane estimation unit 351, after the entry into the main track of the high-standard road enables travel lane estimation at a given time.

Determination on which lane the vehicle is currently travelling can be difficult using only information about the lateral-movement amounts. Accordingly, for instance, an initial travel lane needs to be calculated at the time of merge into the main track of the high-standard road and other timing. The initial travel lane can be determined by referring to the shape of a division line at a portion of merge into the main track of the high-standard road, contained in map information.

Unlike the travel-lane estimation systems 1 and 2, the travel-lane estimation system 3 downsizes an error range to be reflected, from a three-dimensional range to a single-dimensional range. This greatly reduces the number of correction amount candidates generated in the correction-amount-candidate generator 321, thereby greatly reducing the volume of correction amount calculation. Consequently, for the same volume of calculation, increasing the resolving power of an orientation Θ enables more accurate calculation of the optimal correction amount, thereby enhancing the accuracy of lane change detection. Conversely, for the same order of the resolving power of the orientation Θ, the volume of calculation is reduced, thereby more rapidly achieving the results of travel lane estimation. This is more effective because high-speed travel is presumed in the high-standard road, thus requiring more rapid travel-lane estimation. Here, the high-standard road is a road having no speed-limiting factors, such as grade intersections and traffic signals, and being travelable at a higher speed than a road having such speed-limiting factors. In Japan, an example of the high-standard road is an expressway including a national expressway and an exclusive motor-vehicle way. It is noted that the definition of the high-standard road is applied to the whole text of the Description and the Claims.

As described above, the travel-lane estimation system includes the following: a GNSS receiver configured to receive a coordinate of a vehicle through a GNSS; a vehicle-speed calculation means for calculating a vehicle speed from a travel distance of the vehicle; an angular-velocity measurement means for measuring an angular velocity from an amount of change in vehicle's orientation; a subject-vehicle-position positioning unit configured to calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity; a map information storage configured to store map information including positional information about a division line of a lane; and a lane estimation unit configured to calculate, as an optimal correction amount, an error pattern having a posterior probability that is the highest among a plurality of error patterns, correct the time series data using the optimal correction amount, and compare the time series data as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line.

The travel-lane estimation system determines the posterior probability using the positional information about the division line of each lane and corrects the posterior probability using the optimal correction amount. This enables, from a vehicle's trace, accurate lane-change detection and accurate estimation of a current travel lane. In addition, the travel-lane estimation system enables the occurrence of a lane change and the direction of the lane change (right or left) to be detected.

The relative positional relationship between the time series data and the division line includes at least one of the relationship of intersection between the line linking the time series data and the division line, and the distance-continuation relationship between the time series data and the division line.

Furthermore, the error pattern is only the orientation error. This greatly reduces the volume of calculation. Travel lane estimation needs to be more rapidly done in the high-standard road, on which the vehicle is presumed to travel at high speed. Thus, the high-standard road involves further reduced volume of calculation.

Fourth Embodiment

FIG. 16 is a diagram illustrating the configuration of a travel-lane estimation system 4 according to a fourth embodiment. Unlike the travel-lane estimation system 3 according to the third embodiment, the travel-lane estimation system 4 includes the simple-map-information storage 51 and the division line calculator 52 instead of the map information storage 50. >The travel-lane estimation system 4 is configured in the same manner as the travel-lane estimation system 3 with the exception that the simple-map-information storage 51 and the division line calculator 52 are substituted for the map information storage 50, which stores the map information including the positional, information about the division line of each lane.

The travel-lane estimation system 4 includes the simple-map-information storage 51 and the division line calculator 52 instead of the map information storage 50. This is a difference between the travel-lane estimation system 4 and the travel-lane estimation system 1 according to the first embodiment. Another difference between these systems is that although the travel-lane estimation system 1 uses the X-coordinate, Y-coordinate, and orientation as an error pattern, the travel-lane estimation system 4 uses the orientation alone as an error pattern.

In FIG. 16, the GNSS receiver 110, the vehicle-speed calculation means 120, the angular-velocity measurement means 130, the subject-vehicle-position positioning unit 200, and the positioning result accumulator 310 are configured and operate in a manner similar to those in the first to third embodiments. Further, the simple-map-information storage 51 and the division line calculator 52 are configured and operate in a manner similar to those in the second embodiment. Still further, the correction-amount-candidate generator 321, the posterior-probability operation unit 331, the optimal-correction-amount operation unit 341, the travel-lane estimation unit 351, and the lane estimation unit 301 are configured and operate in a manner similar to those in the third embodiment. These common components will not be elaborated upon here.

As described above, the travel-lane estimation system includes the following: a GNSS receiver configured to receive a coordinate of a vehicle through a GNSS; a vehicle-speed calculation means for calculating a vehicle speed from a travel distance of the vehicle; an angular-velocity measurement means for measuring an angular velocity from an amount of change in vehicle's orientation; a subject-vehicle-position positioning unit configured to calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity; a simple-map-information storage configured to store map information including information about node coordinates forming a road link, a road width, the number of lanes, and a travelable direction; a division line calculator configured to calculate a division line of a lane from the map information; and a lane estimation unit configured to calculate, as an optimal correction amount, an error pattern having a posterior probability that is the highest among a plurality of error patterns, correct the time series data using the optimal correction amount, and compare the time series data as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line. This enables, from a vehicle's trace, accurate detection of a lane change and accurate estimation of a current travel lane.

The relative positional relationship between the time series data and the division line includes at least one of a relationship of intersection between the line linking the time series data and the division line, and a distance-continuation relationship between the time series data and the division line. Furthermore, the error pattern is only the orientation error.

The travel-lane estimation system 4 enables map information used in a navigation system to be used as it now stands and enables a lane on which a subject vehicle is travelling to be grasped. This facilitates providing more suitable instructions, such as announcements. In addition, the travel-lane estimation system 4 facilitates travel lane estimation in automated driving and driving assist function.

Furthermore, the error pattern is only the orientation error. This greatly reduces the volume of calculation. Travel lane estimation needs to be more rapidly done in a high-standard road, in which the vehicle is presumed to travel at high speed. Thus, the high-standard road involves further reduced volume of calculation.

Fifth Embodiment

Figure 17:
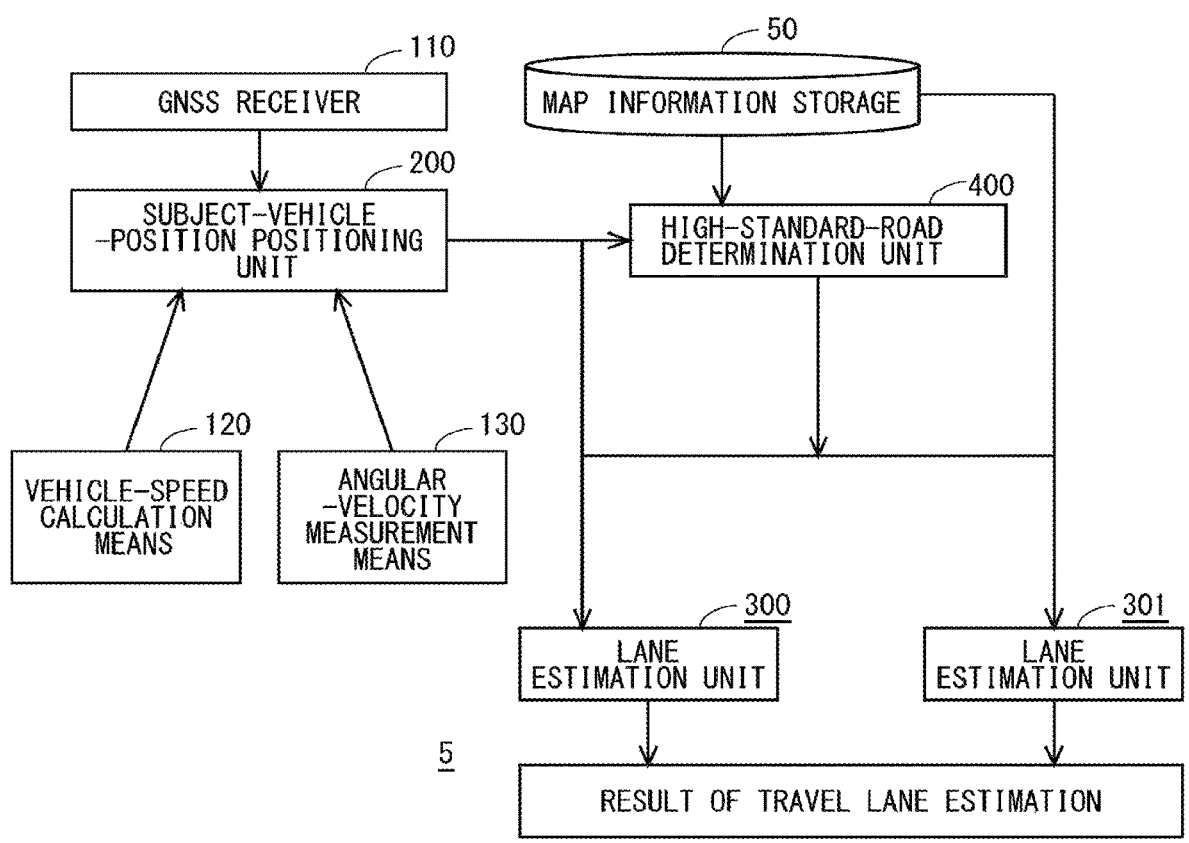
FIG. 17 is a diagram illustrating the configuration of a travel-lane estimation system according to a fifth embodiment.

FIG. 17 is a diagram illustrating the configuration of a travel-lane estimation system 5 according to a fifth embodiment. The travel-lane estimation system 5 has a configuration with a high-standard-road determination unit 400 added to the combination of the configurations in the first and third embodiments.

The high-standard-road determination unit 400 obtains a GNSS coordinate of a subject vehicle from the subject-vehicle-position positioning unit 200, and determines, from road information in the map information storage 50, whether the type of road on which the subject vehicle is, located is a high-standard road. When the road is determined to be a high-standard road, the lane estimation unit 301 estimates a lane using an orientation error alone as an error pattern so that the lane is rapidly estimated. This lane estimation unit 301, which is configured and functions in the same manner as the lane estimation unit 301 in the third and fourth embodiments, will not be elaborated upon here.

When the road is determined to be a non-high-standard road, which does not require as rapid lane estimation as the high-standard road, the lane estimation unit 300 estimates a lane using the combination of a coordinate error and the orientation error as an error pattern. This lane estimation unit 300, which is configured and functions in the same manner as the lane estimation unit 300 in the first and second embodiments, will not be elaborated upon here.

The information stored in the map information storage 50 includes information about types of road, particularly, information on whether the road is a high-standard road. The high-standard-road determination unit 400, although obtaining the GNSS coordinate of the subject vehicle from the subject-vehicle-position positioning unit 200, may obtain the GNSS coordinate directly from the GNSS receiver 110.

As described above, the travel-lane estimation system includes the following: a GNSS receiver configured to receive a coordinate of a vehicle through a GNSS; a vehicle-speed calculation means for calculating a vehicle speed from a travel distance of the vehicle; an angular-velocity measurement means for measuring an angular velocity from an amount of change in vehicle's orientation; a subject-vehicle-position positioning unit configured to calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity; a map information storage configured to store map information including positional information about a division line of a lane; and a lane estimation unit configured to calculate, as an optimal correction amount, an error pattern having a posterior probability that is the highest among a plurality of error patterns, correct the time series data using the optimal correction amount, and compare the time series data as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line.

The travel-lane estimation system determines the posterior probability using the positional information about the division line of each lane and corrects the posterior probability using the optimal correction amount. This enables, from a vehicle's trace, accurate lane-change detection and accurate estimation of a current travel lane. In addition, the travel-lane estimation system enables the occurrence of a lane change and the direction of the lane change (right or left) to be detected.

The relative positional relationship between the time series data and the division line includes at least one of a relationship of intersection between a line linking the time series data and the division line, and a distance-continuation relationship between the time series data and the division line.

The error pattern is the orientation error alone in the high-standard road, and is the combination of the coordinate error and the orientation error in the other kinds of road. This enables, from a vehicle's trace, rapid and efficient detection of a lane change with accuracy, and rapid and efficient estimation of a current travel lane with accuracy.

Sixth Embodiment

FIG. 18 is a diagram illustrating the configuration of a travel-lane estimation system 6 according to a sixth embodiment. The travel-lane estimation system 6 has a configuration with the high-standard-road determination unit 400 added to the combination of the configurations in the second and fourth embodiments.

The high-standard-road determination unit 400 obtains a GNSS coordinate of a subject vehicle from the subject-vehicle-position positioning unit 200 and determines, from road information in the simple-map-information storage 51, whether the type of road on which the subject vehicle is located is a high-standard road. When the road is determined to be a high-standard road, the lane estimation unit 301 estimates a lane using an orientation error alone as an error pattern so that the lane is rapidly estimated. This lane estimation unit 301, which is configured and functions in the same manner as the lane estimation unit 301 in the third and fourth embodiments, will not be elaborated upon here.

When the road is determined to be a non-high-standard road, which does not require as rapid lane estimation as the high-standard road, the lane estimation unit 300 estimates a lane using the combination of a coordinate error and the orientation error as an error pattern. This lane estimation unit 300, which is configured and functions in the same manner as the lane estimation unit 300 in the first and second embodiments, will not be elaborated upon here.

The information stored in the simple-map-information storage 51 includes information about types of road, particularly, information on whether the road is a high-standard road. The high-standard-road determination unit 400, although obtaining the GNSS coordinate of the subject vehicle from the subject-vehicle-position positioning unit 200, may obtain the GNSS coordinate directly from the GNSS receiver 110.

As described above, the travel-lane estimation system includes the following: a GNSS receiver configured to receive a coordinate of a vehicle through a GNSS; a vehicle-speed calculation means for calculating a vehicle speed from a travel distance of the vehicle; an angular-velocity measurement means for measuring an angular velocity from an amount of change in vehicle's orientation; a subject-vehicle-position positioning unit configured to calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity; a simple-map-information storage configured to store map information including information about node coordinates forming a road link, a road width, the number of lanes, and a travelable direction; a division line calculator configured to calculate a division line of a lane from the map information; and a lane estimation unit configured to calculate, as an optimal correction amount, an error pattern having a posterior probability that is the highest among a plurality of error patterns, correct the time series data using the optimal correction amount, and compare the time series data as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line.

The travel-lane estimation system determines the posterior probability using the positional information about the division line of each lane and corrects the posterior probability using the optimal correction amount. This enables, from a vehicle's trace, accurate lane-change detection and accurate estimation of a current travel lane. In addition, the travel-lane estimation system enables the occurrence of a lane change and the direction of the lane change (right or left) to be detected.

The relative positional relationship between the time series data and the division line includes at least one of a relationship of intersection between a line linking the time series data and the division line, and a distance-continuation relationship between the time series data and the division line.

The error pattern is the orientation error alone in the high-standard road, and is the combination of the coordinate error and the orientation error in the other kinds of road. This enables, from the vehicle's trace, rapid and efficient detection of a lane change with accuracy, and rapid and efficient estimation of a current travel lane with accuracy.

It is noted that in the present invention, the individual embodiments can be freely combined, or can be modified and omitted as appropriate, within the scope of the invention. While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1, 2, 3, 4, 5, 6 travel-lane estimation system, 50 map information storage, 51 simple-map-information storage, 52 division line calculator, 110 GNSS receiver, 120 vehicle-speed calculation means, 130 angular-velocity measurement means, 200 subject-vehicle-position positioning unit, 300, 301 lane estimation unit, 310 positioning result accumulator, 320, 321 correction-amount-candidate generator, 330, 331 posterior-probability operation unit, 340, 341 optimal-correction-amount operation unit, 350, 351 travel-lane estimation unit, 400 high-standard-road determination unit.

The invention claimed is:

1. A travel-lane estimation system comprising:
a GNSS receiver configured to receive a coordinate of a vehicle through a Global-Navigation-Satellite-System (GNSS); and
circuitry configured to
calculate a vehicle speed from a travel distance of the vehicle;
measure an angular velocity from an amount of change in vehicle's orientation;
calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity;
store map information including positional information about a division line of a lane; and
calculate, as a calculated correction amount, an error pattern having a posterior probability that is the highest among a plurality of error patterns, correct the time series data using the calculated correction amount, and compare the time series data as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line.

2. A travel lane estimation system comprising:
a GNSS receiver configured to receive a coordinate of a vehicle through a Global-Navigation-Satellite-System (GNSS); and
circuitry configured to
calculate a vehicle speed from a travel distance of the vehicle;
measure an angular velocity from an amount of change in vehicle's orientation;
calculate a reference coordinate of the vehicle and a reference orientation of the vehicle from the coordinate, and calculate time series data of positioning coordinates of the vehicle and positioning orientations of the vehicle from the reference coordinate, the reference orientation, the vehicle speed, and the angular velocity;
store map information including information about node coordinates forming a road link, a road width, the number of lanes, and a travelable direction;
calculate a division line of a lane from the map information; and
calculate, as a calculated correction amount, an error pattern having a posterior probability that is the highest among a plurality of error patterns, correct the time series data using the calculated correction amount, and compare the time series as corrected with the division line, to estimate a travel lane of the vehicle, the posterior probability being calculated with a product of a prior occurrence probability of the time series data by the plurality of error patterns and a likelihood which is calculated, under a condition that the error pattern has occurred, on the basis of a relative positional relationship between the time series data after correction and the division line.

3. The travel-lane estimation system according to claim 1, wherein the relative positional relationship between the time series data and the division line includes at least one of a relationship of intersection between a line linking the time series data and the division line, or a distance-continuation relationship between the time series data and the division line.

4. The travel-lane estimation system according to claim 1, wherein the error pattern comprises a combination of a coordinate error and an orientation error.

5. The travel-lane estimation system according to claim 1, wherein the error pattern comprises an orientation error alone.

6. The travel-lane estimation system according to claim 1, wherein the error pattern comprises an orientation error alone in a high-standard road, and comprises a combination of a coordinate error and the orientation error in a road other than the high-standard road.

\* \* \* \* \*